US010252745B2

United States Patent
Nampei

(10) Patent No.: US 10,252,745 B2
(45) Date of Patent: Apr. 9, 2019

(54) MOTOR CONTROL APPARATUS, ELECTRIC POWER STEERING APPARATUS, AND VEHICLE

(71) Applicant: NSK Ltd., Shinagawa-ku, Tokyo (JP)

(72) Inventor: Kouichi Nampei, Fujisawa (JP)

(73) Assignee: NSK, Ltd., Tokyo (JP)

( * ) Notice: Subject to any disclaimer, the term of this patent is extended or adjusted under 35 U.S.C. 154(b) by 0 days.

(21) Appl. No.: 15/549,012

(22) PCT Filed: Jul. 25, 2016

(86) PCT No.: PCT/JP2016/071747
§ 371 (c)(1),
(2) Date: Aug. 4, 2017

(87) PCT Pub. No.: WO2017/026261
PCT Pub. Date: Feb. 16, 2017

(65) Prior Publication Data
US 2018/0093702 A1 Apr. 5, 2018

(30) Foreign Application Priority Data

Aug. 11, 2015 (JP) .................................. 2015-159065
Aug. 11, 2015 (JP) .................................. 2015-159066

(51) Int. Cl.
*B62D 5/04* (2006.01)
*H02P 6/16* (2016.01)
*H02P 29/028* (2016.01)

(52) U.S. Cl.
CPC ........... *B62D 5/0484* (2013.01); *B62D 5/049* (2013.01); *B62D 5/0409* (2013.01);
(Continued)

(58) Field of Classification Search
CPC .. B62D 5/0484; B62D 5/0409; B62D 5/0463; B62D 5/0487
(Continued)

(56) References Cited

U.S. PATENT DOCUMENTS 7,583,039 B2 * 9/2009 Zhong ..................... H02P 6/181
318/400.07
8,080,957 B2 * 12/2011 Miura ....................... H02P 6/10
318/400.01
(Continued)

FOREIGN PATENT DOCUMENTS

EP 1 462 340 A1 9/2004
EP 2 518 890 A1 10/2012
(Continued)

OTHER PUBLICATIONS

Notification Concerning Documents Transmitted (PCT/IB/310) issued in PCT Application No. PCT/JP2016/071747 dated Jan. 3, 2018, including English translation of document C2 (Japanese-language Written Opinion (PCT/ISA/237) previously filed on Aug. 4, 2017 (six (6) pages).
(Continued)

*Primary Examiner* — Jacob D Knutson
(74) *Attorney, Agent, or Firm* — Crowell & Moring, LLP

(57) ABSTRACT

There are provided a motor control apparatus, an electric power steering apparatus, and a vehicle, capable of controlling the driving of an electric motor accurately even when a failure occurs in a motor electric angle detecting unit that detects a motor electric angle. The motor control apparatus includes: a relative offset amount estimating unit that estimates a relative offset amount between a reference value of an output shaft rotational angle detection value of a steering shaft, detected by an output-side rotational angle sensor, and a motor electric angle original point of a three-phase electric motor; and a motor electric angle estimating unit that
(Continued)

calculates a motor electric angle estimate (θme) based on the output shaft rotational angle and the relative offset amount, wherein when at least either one of a resolver and an angle computing unit is abnormal, the driving of the three-phase electric motor is controlled based on the motor electric angle estimate estimated by the motor electric angle estimating unit.

6 Claims, 16 Drawing Sheets

(52) U.S. Cl.
CPC ......... *B62D 5/0463* (2013.01); *B62D 5/0487* (2013.01); *H02P 6/16* (2013.01); *H02P 29/028* (2013.01); *H02P 2203/05* (2013.01)

(58) Field of Classification Search
USPC .................... 180/442, 443, 444, 446; 701/41
See application file for complete search history.

(56) References Cited

U.S. PATENT DOCUMENTS

| | | | | |
|---|---|---|---|---|
| 8,474,570 B2* | 7/2013 | Yanai | ..................... | B62D 5/046 180/443 |
| 8,938,334 B2* | 1/2015 | Wei | ..................... | B62D 15/024 701/41 |
| 2004/0188172 A1 | 9/2004 | Asada | | |
| 2010/0030427 A1* | 2/2010 | Mitsuhara | .......... | B62D 15/0215 701/41 |
| 2011/0074323 A1* | 3/2011 | Mukai | .................. | B62D 5/0463 318/400.21 |
| 2014/0336878 A1* | 11/2014 | Yanai | ..................... | G01D 5/145 701/41 |

FOREIGN PATENT DOCUMENTS

| | | |
|---|---|---|
| EP | 2 784 450 A1 | 10/2014 |
| JP | 2004-291923 A | 10/2004 |
| JP | 2006-296025 A | 10/2006 |
| JP | 2011-51537 A | 3/2011 |
| JP | 4998836 B2 | 8/2012 |

OTHER PUBLICATIONS

International Search Report (PCT/ISA/210) issued in PCT Application No. PCT/JP2016/071747 dated Oct. 25, 2016 with English translation (three pages).
Japanese-language Written Opinion (PCT/ISA/237) issued in PCT Application No. PCT/JP2016/071747 dated Oct. 25, 2016 (three pages).
Japanese Office Action issued in counterpart Japanese Application No. 2015-159066 dated Apr. 18, 2017 with English translation (four pages).
Japanese Decision to Grant a Patent issued in Japanese Application No. 2015-159066 dated Jun. 27, 2017 with English translation (six pages).
Extended European Search Report issued in counterpart European Application No. 16834958.7 dated May 17, 2018 (six (6) pages).

* cited by examiner

FIG. 17A

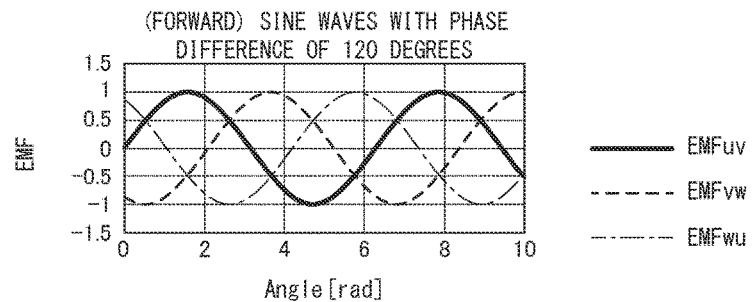

FIG. 17B

| FORWARD DIRECTION | REGION NO | 1 | 2 | 3 | 4 | 5 | 6 | 7 | 8 | 9 | 10 | 11 | 12 |
|---|---|---|---|---|---|---|---|---|---|---|---|---|---|
| | ANGLE | 0~30 | 30~60 | 60~90 | 90~120 | 120~150 | 150~180 | 180~210 | 210~240 | 240~270 | 270~300 | 300~330 | 330~360 |
| MAGNITUDE RELATIONSHIP | UV | SMALL | MEDIUM | LARGE | LARGE | MEDIUM | SMALL | SMALL | MEDIUM | LARGE | LARGE | MEDIUM | SMALL |
| | VW | LARGE | LARGE | MEDIUM | SMALL | SMALL | MEDIUM | LARGE | LARGE | MEDIUM | SMALL | SMALL | MEDIUM |
| | WU | MEDIUM | SMALL | SMALL | MEDIUM | LARGE | LARGE | MEDIUM | SMALL | SMALL | MEDIUM | LARGE | LARGE |
| SIGN RELATIONSHIP | UV | + | + | + | + | + | + | − | − | − | − | − | − |
| | VW | − | − | − | − | + | + | + | + | + | + | − | − |
| | WU | + | + | − | − | − | − | − | − | + | + | + | + |

FIG. 17C

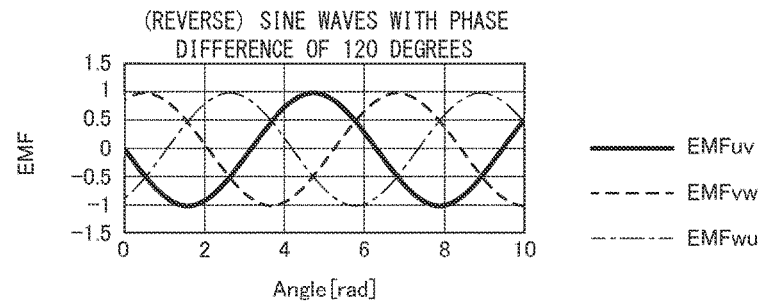

FIG. 17D

| REVERSE DIRECTION | REGION NO | 1 | 2 | 3 | 4 | 5 | 6 | 7 | 8 | 9 | 10 | 11 | 12 |
|---|---|---|---|---|---|---|---|---|---|---|---|---|---|
| | ANGLE | 0~30 | 30~60 | 60~90 | 90~120 | 120~150 | 150~180 | 180~210 | 210~240 | 240~270 | 270~300 | 300~330 | 330~360 |
| MAGNITUDE RELATIONSHIP | UV | SMALL | MEDIUM | LARGE | LARGE | MEDIUM | SMALL | SMALL | MEDIUM | LARGE | LARGE | MEDIUM | SMALL |
| | VW | LARGE | LARGE | MEDIUM | SMALL | SMALL | MEDIUM | LARGE | LARGE | MEDIUM | SMALL | SMALL | MEDIUM |
| | WU | MEDIUM | SMALL | SMALL | MEDIUM | LARGE | LARGE | MEDIUM | SMALL | SMALL | MEDIUM | LARGE | LARGE |
| SIGN RELATIONSHIP | UV | − | − | − | − | − | − | + | + | + | + | + | + |
| | VW | + | + | + | + | − | − | − | − | − | − | + | + |
| | WU | − | − | + | + | + | + | + | + | − | − | − | − |

MOTOR CONTROL APPARATUS, ELECTRIC POWER STEERING APPARATUS, AND VEHICLE

TECHNICAL FIELD

The present invention relates to a motor control apparatus that controls the driving of a multi-phase electric motor mounted in an electric power steering apparatus.

BACKGROUND ART

As the motor control apparatus that controls the electric motor of the electric power steering apparatus mounted on a vehicle, for example, a multi-phase rotary machine control apparatus is disclosed in Patent Literature (PTL) 1.

In the conventional example described in PTL 1, a rotor rotation position θ is detected by a position sensor such as a resolver, and U-phase command voltage Vuu*1, V-phase command voltage Vvu*1, and W-phase command voltage Vwu*1 as three-phase voltage command values are calculated based on command voltages Vd1, Vq1, and the rotor rotation position θ.

CITATION LIST

Patent Literature

PTL 1: JP 4998836

SUMMARY OF INVENTION

Technical Problem

However, since the above-mentioned conventional example of PTL 1 does not consider a case of a failure in the position sensor that detects the rotor rotation position, it is difficult to control the driving of the multi-phase rotary machine accurately after the failure.

The present invention has been made by focusing on the unsolved problem in the above-mentioned conventional example, and it is an object of the present invention to provide a motor control apparatus, an electric power steering apparatus, and a vehicle, capable of continuing to control the driving of an electric motor accurately even when a failure occurs in a motor electric angle detecting unit that detects a motor electric angle.

Solution to Problem

In order to achieve the above object, a motor control apparatus according to a first aspect of the present invention includes: an offset amount estimating unit that estimates a relative offset amount between a reference value of a steering angle, detected by a steering angle detecting unit that detects the steering angle, and an original point of a motor electric angle of a multi-phase electric motor that generates a steering assist force; a motor electric angle estimating unit that estimates the motor electric angle based on the steering angle and the relative offset amount; and a motor driving control unit that controls the driving of the multi-phase electric motor based on the motor electric angle detected by a motor electric angle detecting unit that detects the motor electric angle when the motor electric angle detecting unit is normal, and controls the driving of the multi-phase electric motor based on a motor electric angle estimate estimated by the motor electric angle estimating unit when the motor electric angle detecting unit is abnormal.

Further, in order to achieve the above object, a motor control apparatus according to a second aspect of the present invention includes: a motor electric angle estimating unit that estimates a motor electric angle of a multi-phase electric motor based on a steering angle detected by a steering angle detecting unit that detects the steering angle, where the multi-phase electric motor generates a steering assist force; and a motor driving control unit that controls the driving of the multi-phase electric motor based on a motor electric angle detected by a motor electric angle detecting unit that detects the motor electric angle when the motor electric angle detecting unit is normal, and controls the driving of the multi-phase electric motor based on a motor electric angle estimate estimated by the motor electric angle estimating unit when the motor electric angle detecting unit is abnormal.

An electric power steering apparatus according to a third aspect of the present invention includes the motor control apparatus according to the above-mentioned first or second aspect.

A vehicle according to a fourth aspect of the present invention includes the electric power steering apparatus according to the above-mentioned third aspect.

Advantageous Effects of Invention

According to the present invention, the relative offset amount between the reference value of the steering angle, detected by the steering angle detecting unit, and the original point of the motor electric angle of the multi-phase electric motor is estimated to estimate the motor electric angle based on the steering angle and the relative offset amount. Alternatively, the motor electric angle of the multi-phase electric motor is estimated based on the steering angle detected by the steering angle detecting unit. Then, when the motor electric angle detecting unit that detects the motor electric angle is abnormal, the driving of the multi-phase electric motor can be controlled based on the motor electric angle estimate estimated by the motor electric angle estimating unit. Thus, the multi-phase electric motor can continue to be driven even when the motor electric angle detecting unit is abnormal.

Further, since the electric power steering apparatus is configured to include the motor control apparatus having the above effect, the driving of the multi-phase electric motor can be controlled by the motor electric angle estimate even when an abnormality occurs in the motor electric angle detecting unit, and hence the steering assist function of the electric power steering apparatus can be continued.

Further, since the vehicle is configured to include the electric power steering apparatus having the above effects, the steering assist function of the electric power steering apparatus can be continued even when an abnormality occurs in the motor electric angle detecting unit, and hence reliability can be improved.

BRIEF DESCRIPTION OF DRAWINGS

FIG. 11A is a waveform diagram illustrating an example of a torque command value used to estimate the original point of the motor electric angle, and FIGS. 11B and 11C are waveform diagrams illustrating examples of response waveforms of output torque when drive current caused by respective stepped wave-like command values are input to the electric motor;

FIGS. 17A-17C are diagrams illustrating interphase back electromotive voltage waveforms, where FIGS. 17A and 17C are diagrams illustrating interphase back electromotive voltage waveforms during forward and reverse rotations of a motor, respectively, and FIG. 17B and FIG. 17D are diagrams illustrating a magnitude relationship and a sign relationship of amplitudes of interphase back electromotive voltage waveforms during the forward and reverse rotations of the motor, respectively;

DESCRIPTION OF EMBODIMENTS

Figure 1:
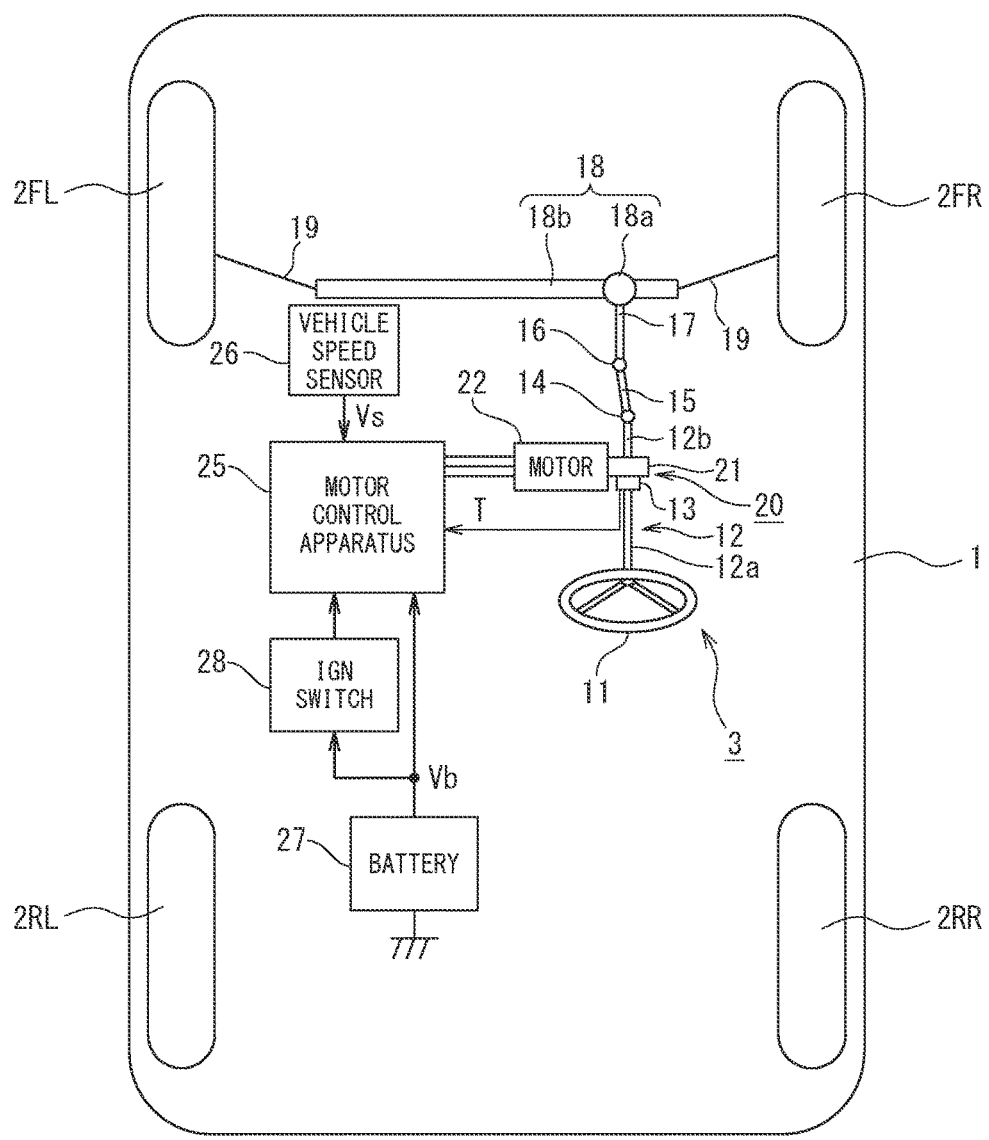
FIG. 1 is a diagram illustrating a configuration example of a vehicle according to a first embodiment of the present invention.

Next, based on the drawings, first to fifth embodiments of the present invention will be described. In the following description of the drawings, the same or similar parts are given the same or similar reference numerals. Note that the drawings are schematic, and dimensional relationships, ratios, and the like, may be different from those in reality.

Further, the first to fifth embodiments to be described below are to exemplify apparatuses and methods for embodying the technical ideas of the present invention, and the technical ideas of the present invention are not to limit the materials, shapes, structures, layouts, and the like of component parts to those to be mentioned below. Various changes can be added to the technical ideas of the present invention within the technical scope described in appended claims.

First Embodiment (Configuration)

As illustrated in FIG. 1, a vehicle 1 according to the embodiment of the present invention includes front wheels 2FR and 2FL, and rear wheels 2RR and 2RL as right and left steered wheels. The front wheels 2FR and 2FL are steered by an electric power steering apparatus 3.

The electric power steering apparatus 3 has a steering wheel 11, and a steering force applied from a driver to this steering wheel 11 is transmitted to a steering shaft 12. This steering shaft 12 has an input shaft 12a and an output shaft 12b. One end of the input shaft 12a is coupled to the steering wheel 11 and the other end thereof is coupled to one end of the output shaft 12b via a torque sensor 13.

Then, the steering force transmitted to the output shaft 12b is transmitted to a lower shaft 15 via a universal joint 14, and further transmitted to a pinion shaft 17 via a universal joint 16. The steering force transmitted to this pinion shaft 17 is transmitted to a tie rod 19 via a steering gear 18 to steer the front wheels 2FR and 2FL as the steered wheels. Here, the steering gear 18 is of a rack-and-pinion type having a pinion 18a coupled to the pinion shaft 17 and a rack 18b meshed with this pinion 18a. Thus, the steering gear 18 converts rotational motion transmitted to the pinion 18a into linear motion in the width direction of the vehicle by means of the rack 18b.

A steering assist mechanism 20 that transmits a steering assist force to the output shaft 12b is coupled to the output shaft 12b of the steering shaft 12. This steering assist mechanism 20 includes a reduction gear 21 configured, for example, as a worm gear mechanism coupled to the output shaft 12b, and a three-phase electric motor 22 as a multiphase electric motor configured, for example, as a three-phase brushless motor coupled to this reduction gear 21 to generate the steering assist force.

Figure 2:
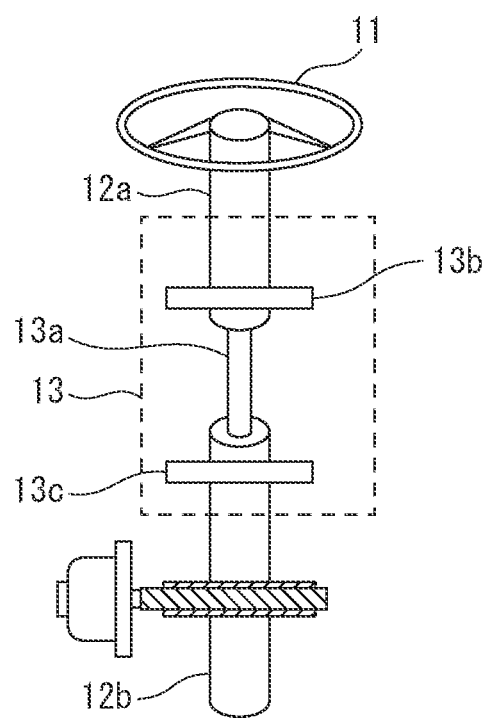
FIG. 2 is a schematic structure diagram illustrating a torque sensor according to the first embodiment of the present invention.

The torque sensor 13 detects steering torque applied to the steering wheel 11 and transmitted to the input shaft 12a. As illustrated in FIG. 2, this torque sensor 13 is configured to convert the steering torque into a torsional angle displacement of an unillustrated torsion bar 13a inserted between the input shaft 12a and the output shaft 12b, and convert this torsional angle displacement into an angular difference between an input-side rotational angle sensor 13b placed on the side of the input shaft 12a and an output-side rotational angle sensor 13c placed on the side of the output shaft 12b to perform the detection.

In the first embodiment, the input-side rotational angle sensor 13b and the output-side rotational angle sensor 13c are sensors that detect a relative angle of rotation.

Figure 3:
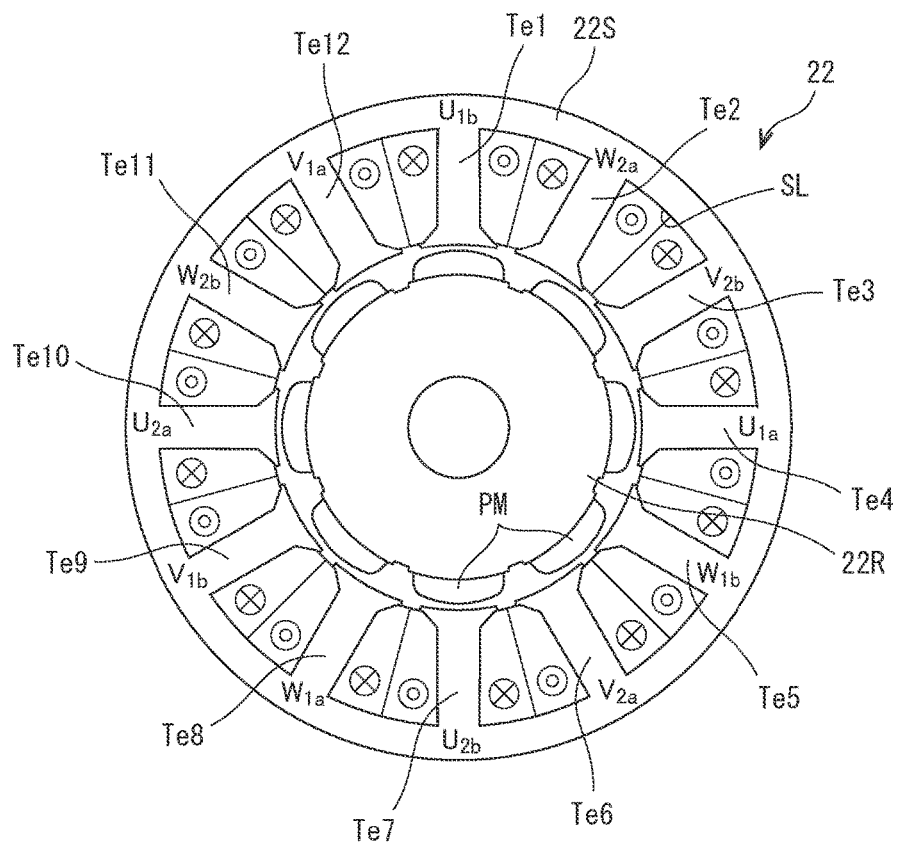
FIG. 3 is a sectional view illustrating the structure of a three-phase electric motor according to the first embodiment of the present invention.

Further, as illustrated in FIG. 3, the three-phase electric motor 22 has the structure of an SPM motor including a stator 22S having teeth Te as magnetic poles formed on the inner peripheral face to protrude inward so as to form slots SL, and an octal surface magnet type rotor 22R having, on the surface thereof, permanent magnets PM arranged rotatably on the inner peripheral side of this stator 22S to face the teeth Te. Here, the number of teeth Te of the stator 22S is set, for example, to n=2 in the case of the number of phases×2n (where n is an integer of 2 or more) to construct eight poles and 12 slots.

Figure 4:
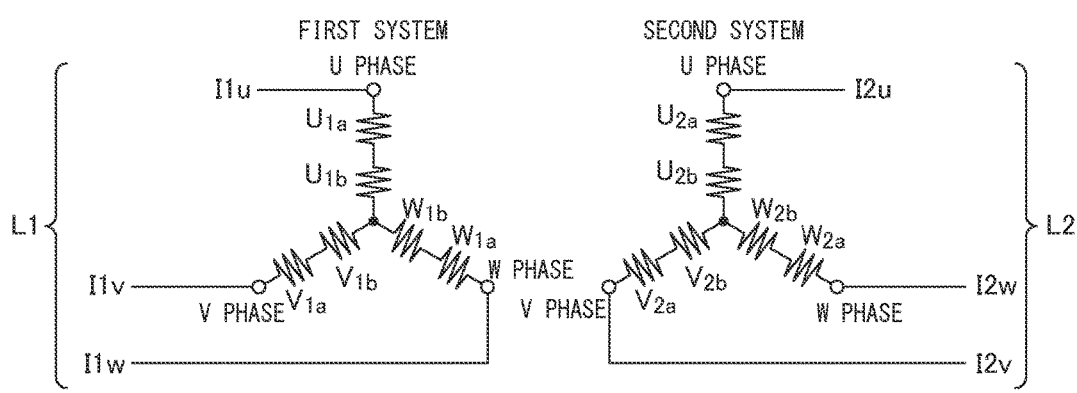
FIG. 4 is a schematic diagram illustrating a winding structure of the three-phase electric motor in FIG. 3.

Then, in two systems illustrated in FIG. 4, first three-phase motor winding L1 and second three-phase motor winding L2 as multiphase motor windings, in which each in-phase magnetic pole is in phase with each rotor magnet, are wound in each slot SL of the stator 22S. The first three-phase motor winding L1 is so configured that one end of U-phase coils U1a, U1b, one end of V-phase coils V1a, V1b, and one end of W-phase coils W1a, W1b will be connected by star connection. Further, the other end of the U-phase coils U1a, U1b, the other end of the V-phase coils V1a, V1b, and the other end of the W-phase coils W1a, W1b are connected to a motor control apparatus 25 to supply motor drive currents I1u, I1v, and I1w individually.

The second three-phase motor winding L2 is so configured that one end of U-phase coils U2a, U2b, one end of V-phase coils V2a, V2b, and one end of W-phase coils W2a, W2b will be connected by star connection. Further, the other end of the U-phase coils U2a, U2b, the other end of the V-phase coils V2a, V2b, and the other end of the W-phase coils W2a, W2b are connected to the motor control apparatus 25 to supply motor drive currents I2u, I2v, and I2w individually.

Then, respective phases of coil units U1a, U1b, V1a, V1b, and W1a, W1b of the first three-phase motor winding L1, and respective phases of coil units U2a, U2b, V2a, V2b, and W2a, W2b of the second three-phase motor winding L2 are so wound that the direction of energization current into each slot SL between respective teeth Te will be the same direction.

Thus, the respective phases of coil units U1a, U1b, V1a, V1b, and W1a, W1b of the first three-phase motor winding L1, and the respective phases of coil units U2a, U2b, V2a, V2b, and W2a, W2b of the second three-phase motor winding L2 are wound around 12 teeth Te1 to Te12 different from one another. In other words, the phase coils U1a, U1b, V1a, V1b, and W1a, W1b as the first system are wound around the 12 teeth Te1 to Te12 in order counter-clockwise in the same winding direction, and then, the phase coils U2a, U2b, V2a, V2b, and W2a, W2b as the second system are wound around in order counter-clockwise in the same winding direction. Further, the phase coils U1a, U1b, V1a, V1b, and W1a, W1b as the first system are wound around in order counter-clockwise in the same winding direction, and finally, the phase coils U2a, U2b, V2a, V2b, and W2a, W2b as the second system are wound around in order counter-clockwise in the same winding direction. In other words, the in-phase coil units of the first three-phase motor winding L1 and the second three-phase motor winding L2 are wound not to be interlinked with the same magnetic flux formed by the permanent magnets PM at respective magnetic poles of the rotor 22R. Thus, the respective coil units of the first three-phase motor winding L1 and the respective coil units of the second three-phase motor winding L2 constitute a magnetic circuit that minimizes magnetic interference with each other.

Figure 5:
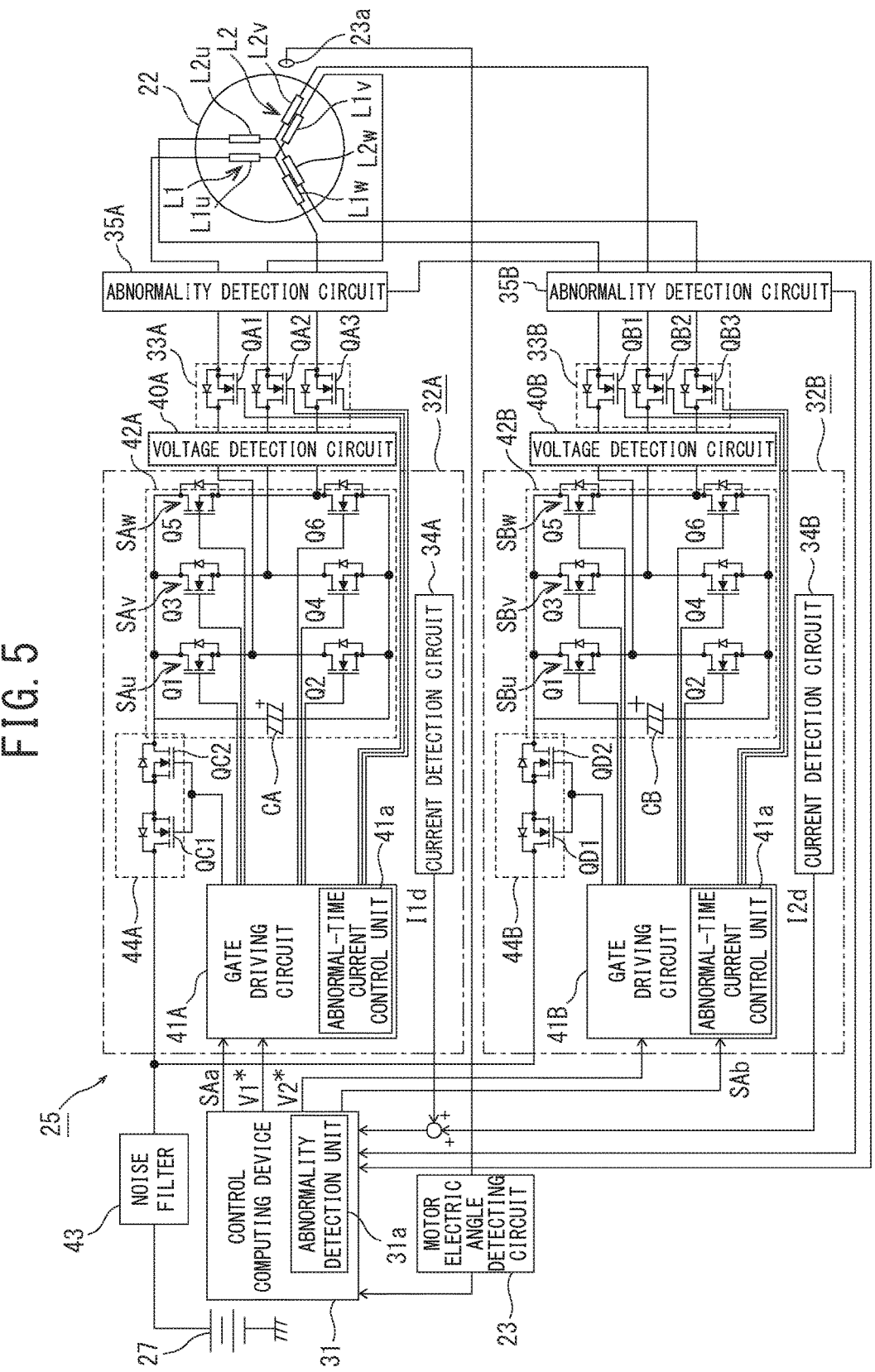
FIG. 5 is a circuit diagram illustrating a specific configuration of a motor control apparatus according to the first embodiment of the present invention.

As illustrated in FIG. 5, the three-phase electric motor 22 further includes a rotational position sensor 23a configured as a resolver that detects a rotational position of the rotor. A detection value from this rotational position sensor 23a is supplied to a motor electric angle detecting circuit 23 so that this motor electric angle detecting circuit 23 will detect a motor electric angle θm. Note that the rotational position sensor, 23a is not limited to the resolver, and it may be configured as any other sensor such as a rotary re-encoder. The rotational position sensor 23a may be referred to as the "resolver 23a" below.

Steering torque T detected by the torque sensor 13 and vehicle speed Vs detected by a vehicle speed sensor 26 are input to the motor control apparatus 25, and a motor electric angle θm output from the motor electric angle detecting circuit 23 is input to the motor control apparatus 25.

Further, direct current is input to the motor control apparatus 25 from a battery 27 as a direct current source. Here, the negative electrode of the battery 27 is grounded, and the positive electrode thereof is connected to the motor control apparatus 25 through an ignition switch 28 (which may be referred to as "IGN switch 28" below) that starts an engine, and connected to the motor control apparatus 25 directly without passing through the IGN switch 28.

A specific configuration of the motor control apparatus 25 is as illustrated in FIG. 5. In other words, the motor control apparatus 25 includes a control computing device 31 that computes a motor current command value, first and second motor driving circuits 32A and 32B to which the motor current command value is output individually from this control computing device 31, and first and second motor current cut-off circuits 33A and 33B inserted between the output side of these first and second motor driving circuits 32A and 32B, and the first and second three-phase motor windings L1 and L2 of the three-phase electric motor 22.

Though not illustrated in FIG. 5, the steering torque T detected by the torque sensor 13 and the vehicle speed Vs detected by the vehicle speed sensor 26 illustrated in FIG. 1 are input to the control computing device 31, and as illustrated in FIG. 5, the motor electric angle em output from the motor electric angle detecting circuit 23 is input to the control computing device 31. Further, motor currents I1m (I1mu, I1mv, I1mw) and I2m (I2mu, I2mv, I2mw) from the respective phases of coils of the first three-phase motor winding L1 and the second three-phase motor winding L2 of the three-phase electric motor 22, which are output from the current detection circuits 34A and 34B, are input to the control computing device 31.

When there is no need to distinguish between the motor currents I1m and I2m, the detection value may be referred to as the "motor current detection value Im (Imu, Imv, Imw)" below.

Further, as illustrated in FIG. 5, motor phase voltages V1m (V1mu, V1mv, V1mw) and V2m (V2mu, V2mv, V2mw) detected by voltage detection circuits 40A and 40B provided between the first and second motor driving circuits 32A and 32B, and the first and second motor current cut-off circuits 33A and 33B are input to the control computing device 31.

When there is no need to distinguish between the motor phase voltages V1m and V2m, the detection value may be referred to as the "motor voltage detection value Vm (Vmu, Vmv, Vmw)" below.

Figure 6:
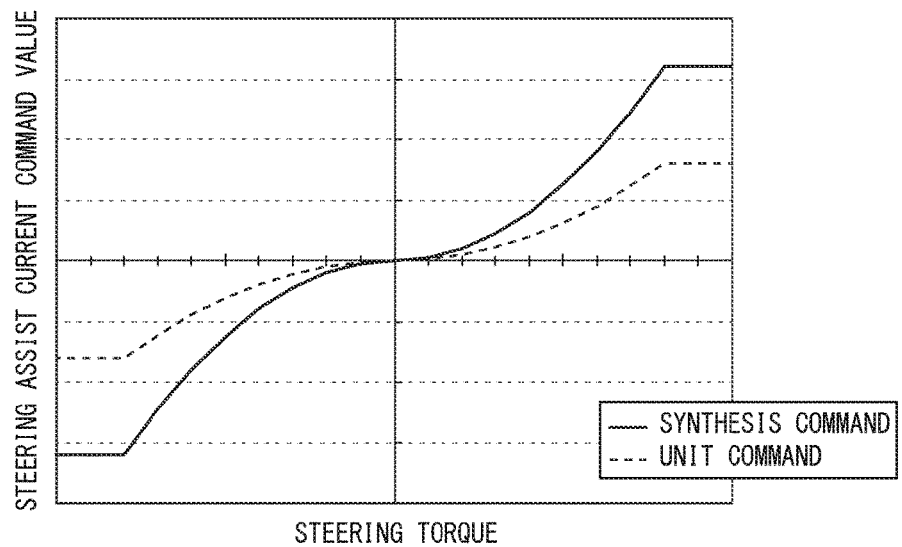
FIG. 6 is a characteristic diagram illustrating a relationship between normal-time steering torque and a steering assist current command value.
Figure 7:
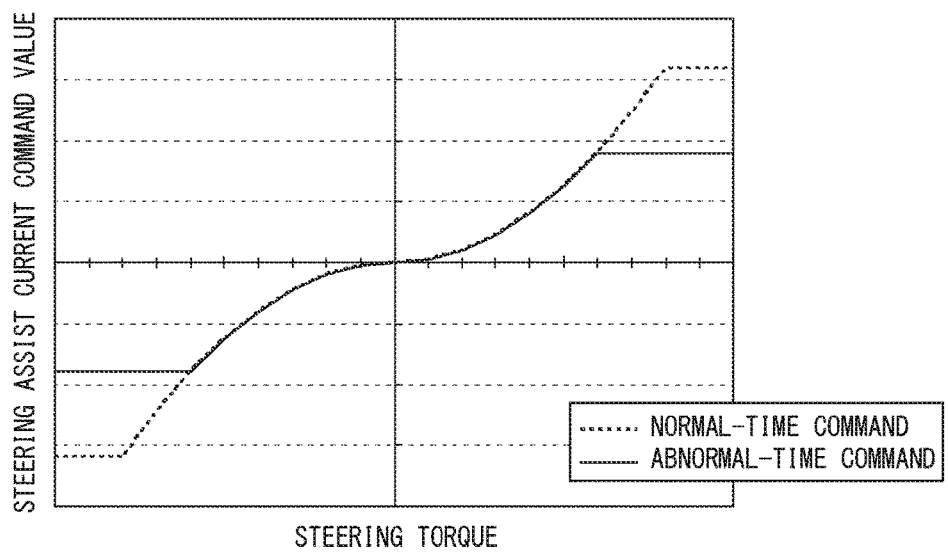
FIG. 7 is a characteristic diagram illustrating a relationship between abnormal-time steering torque and the steering assist current command value.

When the first and second motor driving circuits 32A and 32B are normal, the control computing device 31 refers to a normal-time steering assist current command value calculation map illustrated in FIG. 6, which is preset based on the steering torque T and the vehicle speed Vs, to calculate steering assist current command values I1* and I2*. When the first or second motor driving circuit 32A or 32B is abnormal, the control computing device 31 refers to an abnormal-time steering assist current command value calculation map illustrated in FIG. 7, which is preset based on the steering torque T and the vehicle speed Vs, to calculate the steering assist current command values I1* and I2*.

Based on the calculated steering assist current command values I1* and I2*, and the motor electric angle θm, the control computing device 31 calculates a target d-axis current command value Id* and a target q-axis current command value Iq* in a d-q coordinate system. Further, the control computing device 31 performs dq-phase/three-phase conversion on the calculated d-axis current command value Id* and q-axis current command value Iq* to calculate a U-phase current command value Iu*, a V-phase current command value Iv*, and a W-phase current command value Iw*. Then, the control computing device 31 calculates respective current deviations ΔIu, ΔIv, and ΔIw between the calculated U-phase current command value Iu*, V-phase current command value Iv*, and W-phase current command value Iw*, and additional values of the respective phases of the current detection values detected by the current detection circuits 34A and 34B. Further, the control computing device 31 performs, for example, a PI control computation or a PID control computation on the calculated current deviations ΔIu, ΔIb, and ΔIw to calculate three-phase voltage command values V1* and V2* for the first and second motor driving circuits 32A and 32B. Then, the calculated three-phase voltage command values V1* and V2* are output to the first and second motor driving circuits 32A and 32B.

Furthermore, motor current detection values I1mu, I1mv, I1mw, and I2mu, I2mu, I2mw detected by first and second abnormality detection circuits 35A and 35B, which are provided between the first and second motor current cut-off circuits 33A and 33B, and the first and second three-phase motor windings L1 and L2 of the three-phase electric motor 22, are input to the control computing device 31.

Then, the control computing device 31 compares the input motor current detection values I1mu to I1mw and I2mu to I2mw with the respective phases of current command values Iu*, Iv*, and Iw* calculated by the control computing device 31. Then, the control computing device 31 includes an abnormality detection unit 31a that detects, based on the comparison results, an open failure or a shot circuit failure in field-effect transistors (FETs) Q1 to Q6 as switching elements that constitute first and second inverter circuits 42A and 42B to be described later.

When an open failure or a shot circuit failure in the field-effect transistors (FETs) that constitute the first and second inverter circuits 42A and 42B is detected, this abnormality detection unit 31a outputs an abnormality detection signal SAa or SAb corresponding to a logical value "1" to a gate driving circuit 41A or 41B of the first or second motor driving circuits 32A or 32B in which the abnormality is detected.

Each of the first and second motor driving circuits 32A and 32B includes each of the gate driving circuits 41A and 41B having an abnormal-time current control unit 41a, and each of the first and second inverter circuits 42A and 42B.

The three-phase voltage command values V1* and V2* output from the control computing device 31 are input to the gate driving circuits 41A and 41B, respectively. Then, gate signals are formed based on the input three-phase voltage command values V1* and V2*.

The gate signals output from the gate driving circuits 41A and 41B are input to the first and second inverter circuits 42A and 42B. Then, drive current is supplied to the three-phase electric motor 22 based on the input gate signals.

When the voltage command values V1* and V2* are input from the control computing device 31, each of the gate driving circuits 41A and 41B forms six gate signals subjected to pulse-width modulation (PWM) based on these voltage command values V1* and V2*, and a triangular wave carrier signal Sc. Then, these gate signals are output to the first and second inverter circuits 42A and 42B.

When the abnormality detection signal SAa input from the control computing device 31 is a logical value "0" (normal), the gate driving circuit 41A outputs three high-level gate signals to the first motor current cut-off circuit 33A. In addition, the gate driving circuit 41A outputs two high-level gate signals to the first power shutdown circuit 44A. Further, when the abnormality detection signal SAa is the logical value "1" (abnormal), the gate driving circuit 41A has the abnormal-time current control unit 41a output three low-level gate signals to the first motor current cut-off circuit 33A at the same time to cut off the motor current. In addition, the gate driving circuit 41A outputs two low-level gate signals to the first power shutdown circuit 44A at the same time to cut off the battery power.

Similarly, when the abnormality detection signal SAb input from the control computing device 31 is the logical value "0" (normal), the gate driving circuit 41B outputs three high-level gate signals to the second motor current cut-off circuit 33B. In addition, the gate driving circuit 41B outputs two high-level gate signals to the second power shutdown circuit 44B. Further, when the abnormality detection signal SAb is the logical value "1" (abnormal), the gate driving circuit 41B has the abnormal-time current control unit 41a output three low-level gate signals to the second motor current cut-off circuit 33B at the same time to cut off the motor current. In addition, the gate driving circuit 41B outputs two low-level gate signals to the second power shutdown circuit 44B at the same time to cut off the battery power.

Battery current of the battery 27 is input to each of the first and second inverter circuits 42A and 42B through a noise filter 43, and each of the first and second power shutdown circuit 44A and 44B, and each of smoothing electrolytic capacitors CA and CB is connected to the input side.

Each of these first and second inverter circuits 42A and 42B has field-effect transistors (FET) Q1 to Q6 as six switching elements, having such a structure that three switching arms SAu, SAv, and SAw, in each of which two field-effect transistors are connected in series, are connected in parallel. Then, a gate signal output from each of the gate driving circuits 41A and 41B is input to the gate of each of the field-effect transistors Q1 TO Q6. Thus, U-phase current Iu, V-phase current Iv, and W-phase current Iw are output from between the field-effect transistors of each of the switching arms SAu, SAv, and SAw to each of the first and second three-phase motor windings L1 and L2 of the three-phase electric motor 22 via each of the first and second motor current cut-off circuits 33A and 33B.

Further, though not illustrated, voltage between both ends of a shunt resistor, which is inserted between each of the switching arms SAu, SAv, and SAw in the first and second inverter circuits 42A and 42B, and the ground, is input to each of the current detection circuits 34A and 34B. Then, motor currents I1m (I1mu to I1mw) and I2m (I2mu to I2mw) are detected by these current detection circuits 34A and 34B.

The first motor current cut-off circuit 33A also has three current-cutoff field-effect transistors QA1, QA2, and QA3. The source of the field-effect transistor QA1 is connected to a connection point of the field-effect transistors Q1 and Q2 of the switching arm SAu in the first inverter circuit 42A, and the drain thereof is connected to the U-phase coils U1a, U1b of the first three-phase motor winding L1 via the first abnormality detection circuit 35A. The source of the field-effect transistor QA2 is connected to a connection point of the field-effect transistors Q3 and Q4 of the switching arm SAv in the first inverter circuit 42A, and the drain thereof is connected to the V-phase coils V1a, V1b of the first three-phase motor winding L1 via the first abnormality detection circuit 35A. Further, the source of the field-effect transistor QA3 is connected to a connection point of the field-effect transistors Q5 and Q6 of the switching arm SAw in the first inverter circuit 42A, and the drain thereof is connected to the W-phase coils W1a, W1b of the first three-phase motor winding L1 via the first abnormality detection circuit 35A.

The second motor current cut-off circuit 33B has three current-cutoff field-effect transistors QB1, QB2, and QB3. The source of the field-effect transistor QB1 is connected to a connection point of the field-effect transistors Q1 and Q2 of the switching arm SBu in the second inverter circuit 42B, and the drain thereof is connected to the U-phase coils U2a, U2b of the second three-phase motor winding L2 via the second abnormality detection circuit 35B. The source of the field-effect transistor QB2 is connected to a connection point of the field-effect transistors Q3 and Q4 of the switching arm SBv in the second inverter circuit 42B, and the drain thereof is connected to the V-phase coils V2a, V2b of the second three-phase motor winding L2 via the first abnormality detection circuit 35A. Further, the source of the field-effect transistor QB3 is connected to a connection point of the field-effect transistors Q5 and Q6 of the switching arm SBw in the second inverter circuit 42B, and the drain thereof is connected to the W-phase coils W2a, W2b of the second three-phase motor winding L2 via the first abnormality detection circuit 35A.

Then, the field-effect transistors QA1 to QA3 and QB1 to QB3 of the first and second motor current cut-off circuits 33A and 33B are so connected that the cathodes of respective parasitic diodes D will face the same direction on the side of the first and second inverter circuits 42A and 42B.

Further, the first and second power shutdown circuits 44A and 44B have such a series circuit structure that the drains of respective two field-effect transistors (FET) QC1, QC2 and QD1, QD2 are connected to make the parasitic diodes face opposite directions. Then, the sources of the field-effect transistors QC1 and QD1 are connected to each other, and connected to the output side of the noise filter 43. Further, the source of each of the field-effect transistors QC2 and QD2 is connected to the sources of the field-effect transistors Q1, Q2, and Q3 in each of the first and second inverter circuit 42A and 42B.

(Motor Electric Angle Detecting Circuit 23)

Next, a specific configuration of the motor electric angle detecting circuit 23 according to the first embodiment will be described.

Figure 8:
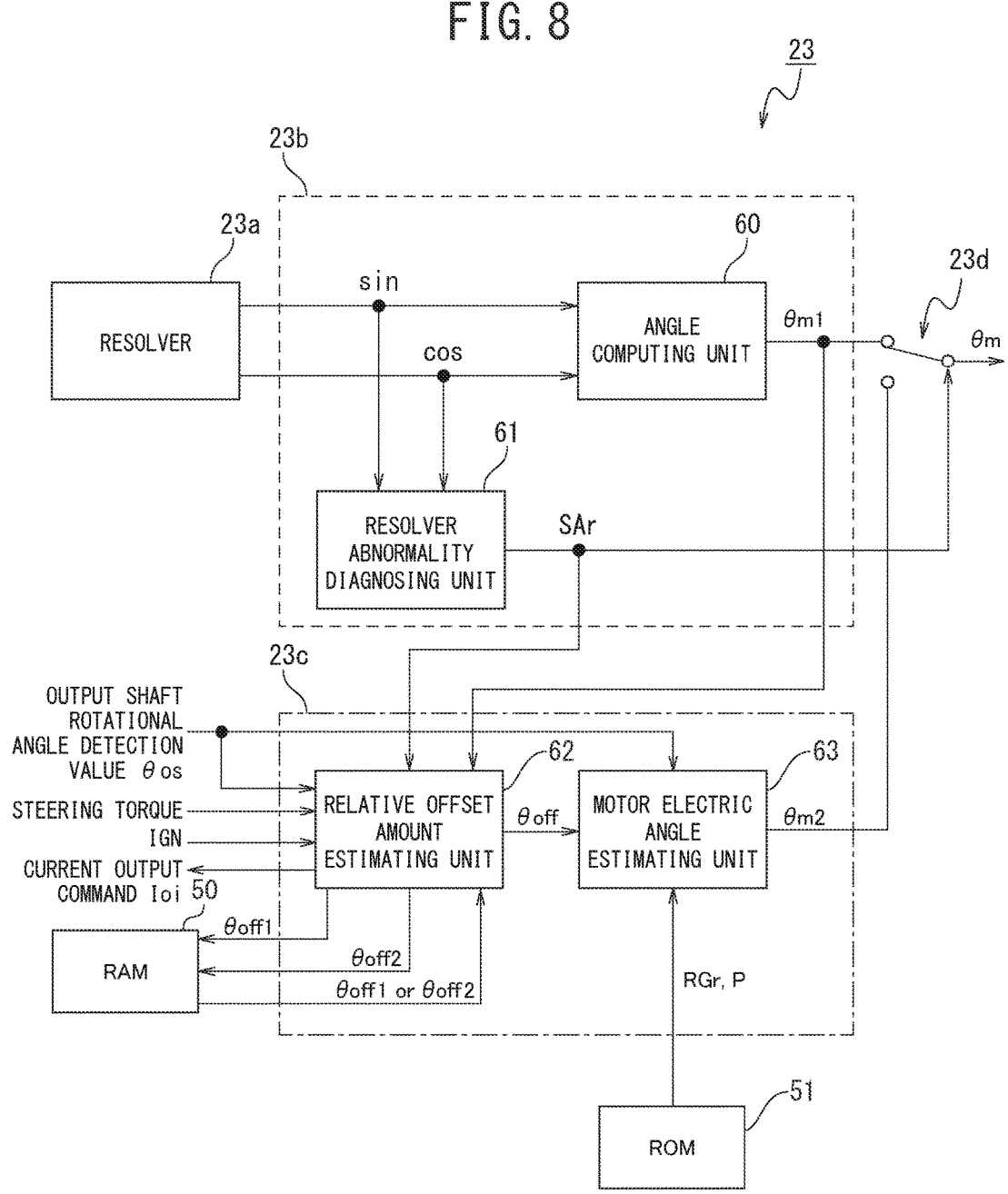
FIG. 8 is a block diagram illustrating a specific configuration of a motor electric angle detecting circuit according to the first embodiment of the present invention.

As illustrated in FIG. 8, the motor electric angle detecting circuit 23 of the first embodiment includes a main motor electric angle detecting circuit 23b, a sub-motor electric angle detecting circuit 23c, an electric angle selection unit 23d, a RAM 50, and a ROM 51.

The main motor electric angle detecting circuit 23b includes an angle computing unit 60 and a resolver abnormality diagnosing unit 61.

The angle computing unit 60 computes a first motor electric angle $\theta m1$ based on a sin signal and a cos signal corresponding to a rotational angle of the three-phase electric motor 22 output from the resolver 23a. Then, the computed first motor electric angle $\theta m1$ is output to the electric angle selection unit 23d.

The resolver abnormality diagnosing unit 61 detects an abnormality of the resolver 23a, and outputs an abnormality detection signal SAr.

Though not illustrated in FIG. 5, an output shaft rotational angle detection value $\theta os$ output from the output-side rotational angle sensor 13c, the steering torque T, and an ignition signal IGN indicative of ignition ON/OFF output from the IGN switch 28 are input to the sub-motor electric angle detecting circuit 23c. In addition, the first motor electric angle $\theta m1$ from the angle computing unit 60, and the abnormality detection signal SAr from the resolver abnormality diagnosing unit 61 are input.

This sub-motor electric angle detecting circuit 23c includes a relative offset amount estimating unit 62 and a motor electric angle estimating unit 63.

The relative offset amount estimating unit 62 estimates a relative offset amount $\theta off$ between an original point $\theta md$ of the motor electric angle $\theta m$ (which may be referred to as the "motor electric angle original point $\theta md$" below) and a reference value $\theta osr$ of the output shaft rotational angle detection value $\theta os$. Then, the estimated relative offset amount $\theta off$ is output to the motor electric angle estimating unit 63.

The motor electric angle estimating unit 63 reads, from the ROM 51, prestored reduction ratio RGr of the reduction gear 21 and number P of pole pairs of the rotor 22R of the three-phase electric motor 22. Then, a motor electric angle estimate $\theta me$ is calculated based on the read reduction ratio RGr and number P of pole pairs, the output shaft rotational angle detection value $\theta os$ detected by the output-side rotational angle sensor 13c, and the relative offset amount $\theta off$ estimated by the relative offset amount estimating unit 62. The calculated motor electric angle estimate $\theta me$ is output to the electric angle selection unit 23d as a second motor electric angle $\theta m2$.

Specifically, the motor electric angle estimating unit 63 calculates the motor electric angle estimate $\theta me$ according to the following equation (1):

$$\theta me = \theta os \times RGr \times P + \theta off \quad (1)$$

In other words, the output shaft rotational angle detection value $\theta os$ is multiplied by the reduction ratio RGr and the number P of pole pairs, and the relative offset amount $\theta off$ is added to this multiplication result to calculate the motor electric angle estimate $\theta me$.

When the abnormality detection signal SAr output from the resolver abnormality diagnosing unit 61 in the main motor electric angle detecting circuit 23b is a logical value "0" indicative of no abnormality, the electric angle selection unit 23d selects the first motor electric angle $\theta m1$ output from the main motor electric angle detecting circuit 23b. Then, the selected first motor electric angle $\theta m1$ is output as the motor electric angle $\theta m$ to the control computing device 31 mentioned above. On the other hand, when the abnormality detection signal SAr is a logical value "1" indicating that there is an abnormality, the electric angle selection unit 23d selects the second motor electric angle $\theta m2$ output from the sub-motor electric angle detecting circuit 23c. Then, the selected second motor electric angle θm2 is output as the motor electric angle θm to the control computing device 31.

(Relative Offset Amount Estimating Unit 62)

Next, a specific configuration of the relative offset amount estimating unit 62 according to the first embodiment will be described.

Figure 9:
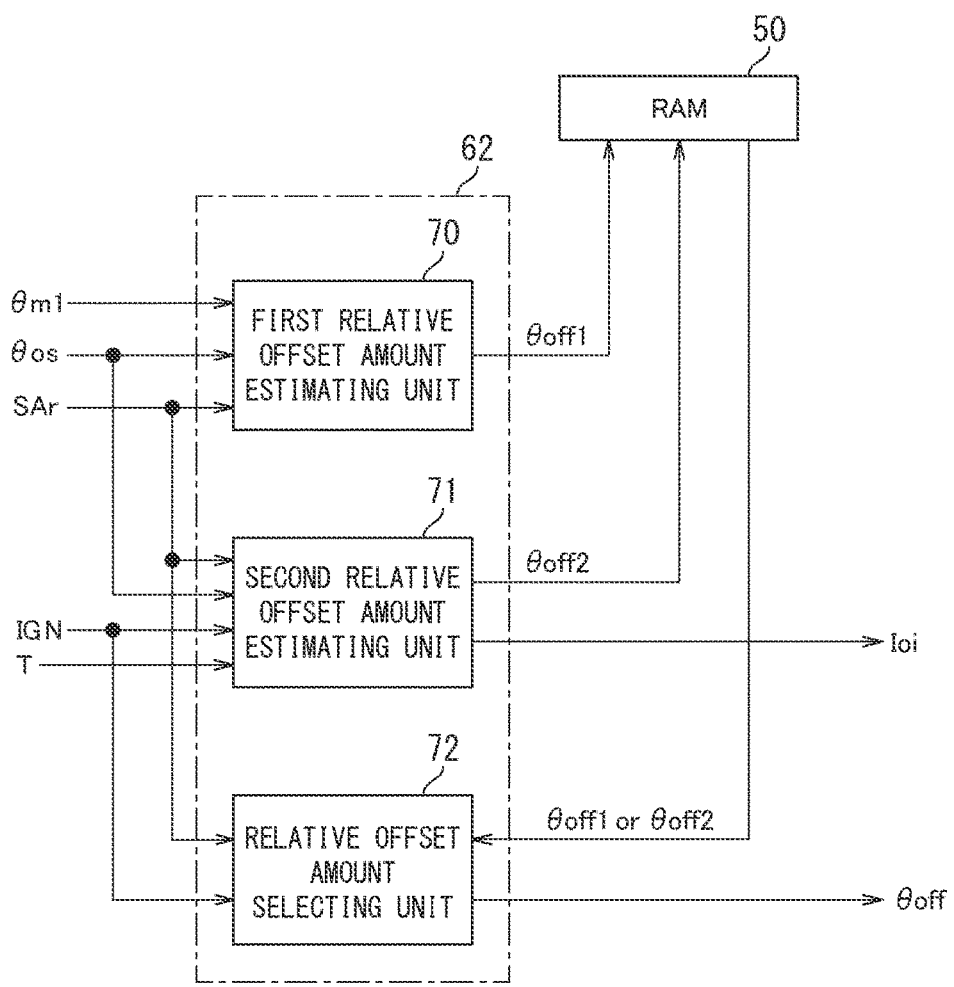
FIG. 9 is a block diagram illustrating a specific configuration of a relative offset amount estimating unit according to the first embodiment of the present invention.

As illustrated in FIG. 9, the relative offset amount estimating unit 62 of the first embodiment includes a first relative offset amount estimating unit 70, a second relative offset amount estimating unit 71, and a relative offset amount selecting unit 72.

When the resolver 23a and the angle computing unit 60 are normal, the first relative offset amount estimating unit 70 estimates a first relative offset amount θoff1 based on the output shaft rotational angle detection value θos detected by the output-side rotational angle sensor 13c, and the motor electric angle detection value θm1 detected by the main motor electric angle detecting circuit 23b. Then, the estimated first relative offset amount θoff1 is stored in the RAM 50.

Here, when the resolver 23a and the angle computing unit 60 are normal, since the original point θmd of the motor electric angle is obtained, a relative offset amount of the output shaft rotational angle to the reference value θosr can be estimated easily.

Note that the reference value θosr is obtained by multiplying the output shaft rotational angle detection value when the system is started (when the IGN switch 28 is changed from OFF to ON) by the number P of pole pairs and the reduction ratio RGr.

Figure 10:
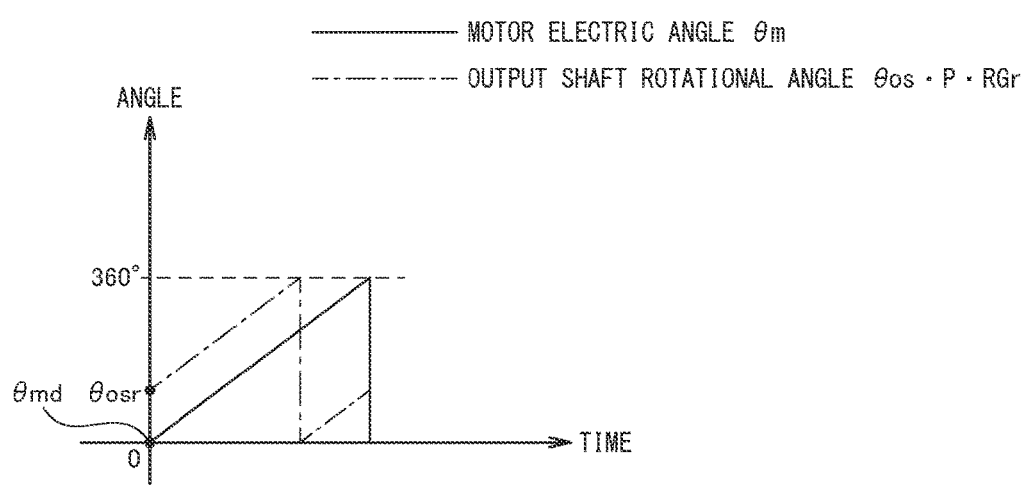
FIG. 10 is a waveform diagram for describing a relationship between the original point of a motor electric angle and a reference value of an output shaft rotational angle.

In order to compensate the motor electric angle θm with the output shaft rotational angle detection value θos·P·RGr, there is a need to make the motor electric angle original point θmd (0 degrees) match the reference value θosr of the output shaft rotational angle. For example, when the reference value θosr and the motor electric angle original point θmd do not match with each other as illustrated in FIG. 10, an angular error occurs as indicated by the dot-and-dash line in the figure at the output shaft rotational angle detection value θos·P·RGr (the amount of displacement from the reference value θosr) with respect to the motor electric angle θm indicated by the solid line in the figure. This causes a big shift from the actual motor electric angle θm.

Therefore, there is a need to calculate, as the relative offset amount, how much the reference value θosr of the output shaft rotational angle is shifted from the motor electric angle original point θmd in order to add the relative offset amount (make a correction with the relative offset amount) at the time of estimating the motor electric angle.

When the abnormality detection signal SAr is a value indicative of being abnormal in the initial diagnosis by the resolver abnormality diagnosing unit 61 at the time of restarting the system to turn on the IGN switch 28 again after the system is shut down to turn off the IGN switch 28, the second relative offset amount estimating unit 71 estimates a second relative offset amount θoff2. Then, the estimated second relative offset amount θoff2 is stored in the RAM 50.

Here, when a failure occurred, for example, in the resolver 23a at the time of the previous system startup, or when a failure occurred, for example, in the resolver 23a during system halt, an abnormality is diagnosed in the initial diagnosis at this time of system startup. In this case, angle data and the like obtained at the time of the previous system startup are all lost. Further, the driver may operate the steering wheel 11 during system halt.

Therefore, when an abnormality is diagnosed at the time of restarting the system, there is a need not only to estimate the motor electric angle original point θmd but to estimate the second relative offset amount θoff2 based on the estimated motor electric angle original point θmd.

The second relative offset amount estimating unit 71 of the first embodiment first stores present steering torque T, detected by the torque sensor 13 at the time of restarting the system, in the RAM 50 as the torque offset amount Toff.

Next, assuming that the present motor electric angle θm is X degrees, a current output command Ioi (including information on the assumed angle of X degrees) is output to the control computing device 31 so that stepped wave-like motor drive current corresponding to X degrees will be input to the three-phase electric motor 22.

The control computing device 31 of the first embodiment is configured to input, to the three-phase electric motor 22, the stepped wave-like motor drive current corresponding to the assumed angle of X degrees in response to input of the current output command Ioi from the sub-motor electric angle detecting circuit 23c.

The second relative offset amount estimating unit 71 acquires the steering torque T detected by the torque sensor 13 in response to input of the stepped wave-like motor drive current to the three-phase electric motor 22.

Subsequently, the second relative offset amount estimating unit 71 subtracts the torque offset amount Toff from the acquired steering torque T.

Here, at the time of system startup, there is a possibility that the driver may apply force to the steering wheel 11 when the IGN switch 28 is turned on, or that the steering torque T may be offset due to the influence of any other load, weight, or the like. In the first embodiment, this offset amount is prestored as the torque offset amount Toff to deduct it from the actual steering torque T.

Then, the second relative offset amount estimating unit 71 determines the symmetry of a torque waveform of the steering torque Tc after subtracting the torque offset amount Toff. In the first embodiment, the determination is made depending on whether the positive and negative amplitudes are equivalent to each other. When it is determined that the positive and negative amplitudes are equivalent, the motor electric angle θm at the time can be estimated to be X degrees assumed.

Figure 11A:
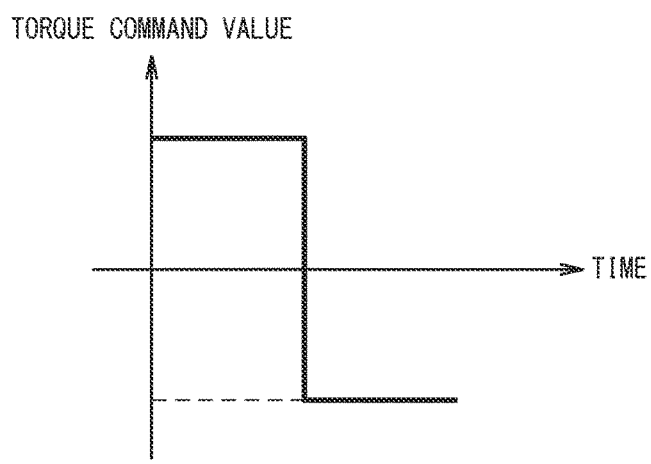
FIGS. 11A-11C contain waveform diagrams, where
Figure 11B:
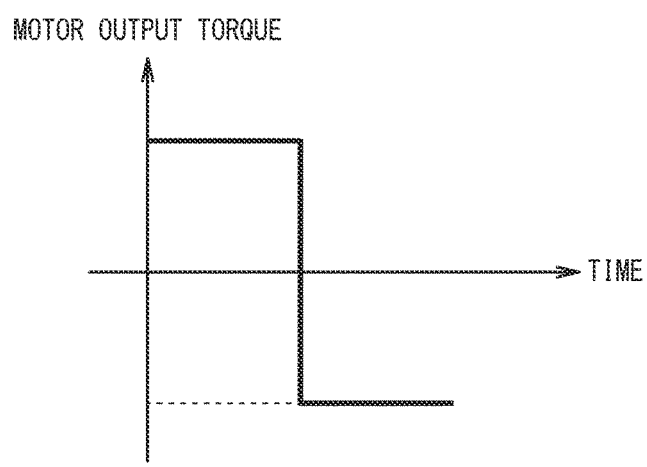

For example, when such a torque waveform that the positive and negative amplitudes are equivalent as illustrated in FIG. 11(b) can be obtained with respect to the stepped wave-like torque command value (motor drive current) as illustrated in FIG. 11(a), the motor electric angle θm at the time can be estimated to be X degrees assumed. In other words, when the assumed angle X and the present motor electric angle θm of the three-phase electric motor 22 match each other, output corresponding to the torque command value can be obtained.

On the other hand, when it is determined that the positive and negative amplitudes of the torque waveform of the steering torque Tc after the subtraction are not equivalent (not to be output corresponding to the torque command value), the motor electric angle θm at the time is determined not to be X degrees assumed.

Figure 11C:
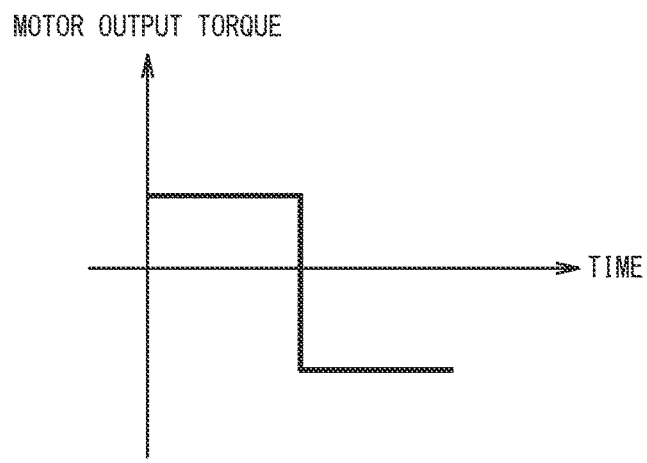

For example, when a torque waveform with different positive and negative amplitudes as illustrated in FIG. 11(c) is obtained, the motor electric angle θm at the time can be determined not to be assumed X degrees with respect to the torque command illustrated in FIG. 11(a).

In this case, the second relative offset amount estimating unit 71 determines, from the shape of the torque waveform with different positive and negative amplitudes, in which direction, the side of 0 degrees or the side of 360 degrees, the present initial position is shifted from the assumed angle of X degrees. Since this shift direction can be found from the shape of the waveform (asymmetry), the current output command Ioi is output to the control computing device 31 to update the assumed angle of X degrees to a value with a smaller shift amount, and then to input, to the three-phase electric motor 22, stepped wave-like motor drive current corresponding to the updated, assumed angle of X degrees. Such processing is repeated until the positive and negative amplitudes of the torque waveform are determined to be equivalent.

When the abnormality detection signal SAr becomes the value indicative of being abnormal during system startup, the relative offset amount selecting unit 72 selects the first relative offset amount θoff1, while when the abnormality detection signal SAr becomes the value indicative of being abnormal in the initial diagnosis after the system is restarted, the relative offset amount selecting unit 72 selects the second relative offset amount θoff2. Then, the selected one of the first relative offset amount θoff1 and the second relative offset amount θoff2 is read from the RAM 50, and output to the motor electric angle estimating unit 63 as the relative offset amount θoff.

(Operation)

Next, operation of the first embodiment will be described.

In a deactivated state, where not only the IGN switch 28 is in the off state and hence the vehicle 1 is stopped, but also the steering assist control processing is also stopped, the control computing device 31 and the motor electric angle detecting circuit 23 in the motor control apparatus 25 are in an inactive state.

Therefore, various processes to be executed by the control computing device 31 and the motor electric angle detecting circuit 23 are stopped. In this state, the three-phase electric motor 22 is deactivated, and output of the steering assist force to a steering mechanism is stopped.

When the IGN switch 28 is turned on from this deactivated state, the control computing device 31 and the motor electric angle detecting circuit 23 are put into an active state to start various processes such as the detection processing of the motor electric angle θm and the steering assist control processing. At this time, it is assumed that the resolver 23a and the angle computing unit 60 are normal.

In this case, the abnormality detection signal SAr becomes the value indicative of no abnormality, and the electric angle selection unit 23d outputs the first motor electric angle θm1 computed by the angle computing unit 60 to the control computing device 31 as the motor electric angle θm.

Based on this motor electric angle θm, the control computing device 31 calculates the d-axis current command value Id* and the q-axis current command value Iq*. Then, based on the d-axis current command value Id* and the q-axis current command value Iq*, the control computing device 31 calculates the three-phase voltage command values V1* and V2* for the first and second motor driving circuits 32A and 32B, and outputs the calculated three-phase voltage command values V1* and V2* to the first and second motor driving circuits 32A and 32B. Thus, the first and second motor driving circuits 32A and 32B control the driving of the first and second inverter circuits 42A and 42B to perform drive control (commutation control) on the three-phase electric motor 22.

In the meantime, when the resolver 23a and the angle computing unit 60 are normal, the relative offset amount estimating unit 62 in the sub-motor electric angle detecting circuit 23c performs estimation processing of the first relative offset amount θoff1. In other words, based on the output shaft rotational angle detection value θos detected by the normal-time output-side rotational angle sensor 13c, and the motor electric angle θm output from the main motor electric angle detecting circuit 23b, the first relative offset amount θoff1 is estimated, and the estimated first relative offset amount θoff1 is stored in the RAM 50.

Then, when the resolver 23a and the angle computing unit 60 are normal, the relative offset amount estimating unit 62 of the first embodiment outputs the first relative offset amount θoff1 stored in the RAM 50 to the motor electric angle estimating unit 63 as the relative offset amount θoff.

When the resolver 23a and the angle computing unit 60 are normal, the motor electric angle estimating unit 63 calculates the motor electric angle estimate θme from the output shaft rotational angle detection value θos detected by the output-side rotational angle sensor 13c, the first relative offset amount θoff1, a reduction ratio RGr (e.g., 20.5), and magnetic pole pairs (e.g., 4). Then, the motor electric angle estimate θme is output to the electric angle selection unit 23d as the second motor electric angle θm2. After that, when a failure occurs in at least either one of the resolver 23a and the angle computing unit 60 during system startup so that the abnormality detection signal SAr will become the value indicative of being abnormal, the electric angle selection unit 23d outputs the second motor electric angle θm2, input from the sub-motor electric angle detecting circuit 23c, to the control computing device 31 as the motor electric angle θm.

Thus, based on the second motor electric angle θm2 estimated by the sub-motor electric angle detecting circuit 23c, the control computing device 31 performs drive control (commutation control) on the three-phase electric motor 22.

Suppose then that the IGN switch 28 is once turned off to halt the system, and after that, the IGN switch 28 is turned on again to restart the system.

In this case, the abnormality detection signal SAr becomes the value indicative of being abnormal in the initial diagnosis by the resolver abnormality diagnosing unit 61 after the system is restarted, and the relative offset amount estimating unit 62 performs estimation processing of the second relative offset amount θoff2.

Specifically, the relative offset amount estimating unit 62 first acquires the steering torque T after the initial diagnosis and stores the steering torque T in the RAM 50 as the torque offset amount Toff. Subsequently, assuming here that the default value of the assumed angle X is 180 degrees, the current output command Ioi is output to the control computing device 31 to input stepped wave-like motor drive current corresponding to 180 degrees to the three-phase electric motor 22. Thus, the stepped wave-like motor drive current corresponding to 180 degrees flows into the three-phase electric motor 22.

Then, the steering torque T detected by the torque sensor 13 in response to the input of the stepped wave-like motor drive current is acquired, and the torque offset amount Toff is subtracted from this steering torque T to determine the symmetry of the torque waveform of the steering torque Tc after the subtraction. Here, it is assumed that the determination result is asymmetric. In this case, the second relative offset amount estimating unit 71 determines a shift direction from the shape of the asymmetric torque waveform to update the assumed angle X in a direction to make the shift smaller.

For example, when the actual motor electric angle θm is 0 degrees, since a 180-degree response waveform is a waveform shifted from 0 degrees in a direction of 360 degrees, the assumed angle X is next updated, for example, to 90 degrees as an intermediate value between 0 degrees and 180 degrees. Then, stepped wave-like motor drive current corresponding to 90 degrees is input to the three-phase electric motor 22 to determine the symmetry of a torque waveform again from response torque. In this case, since the 90-degree response waveform is a waveform shifted from 0 degrees in the 360-degree direction, such processing as to update the assumed angle X next to 45 degrees as an intermediate value between 0 degrees and 90 degrees is repeated until the positive and negative amplitudes of the response torque waveform become equivalent.

Then, an assumed angle X when the positive and negative amplitudes are equivalent is set as the motor electric angle original point θmd. Note that the amplitudes may be determined to be equivalent, for example, when a difference between the positive and negative amplitudes falls within a preset error range, as well as the case where the positive and negative amplitudes become exactly the same amplitude.

The relative offset amount estimating unit 62 calculates the second relative offset amount θoff2 from the estimated motor electric angle original point θmd, and the reference value θosr of the acquired output shaft rotational angle detection value at the time of restarting the system. Then, the calculated second relative offset amount θoff2 is stored in the RAM 50.

Further, as a result of the fact that the abnormality detection signal SAr becomes the value indicative of being abnormal at the time of restarting the system, the relative offset amount estimating unit 62 reads the second relative offset amount θoff2 from the RAM 50, and outputs the read second relative offset amount θoff2 to the motor electric angle estimating unit 63 as the relative offset amount θoff.

Thus, the motor electric angle estimating unit 63 calculates the motor electric angle estimate θme from the output shaft rotational angle detection value θos detected by the output-side rotational angle sensor 13c, the second relative offset amount θoff2, the reduction ratio RGr (e.g., 20.5), and the magnetic pole pairs (e.g., 4). Then, the calculated motor electric angle estimate θme is output to the electric angle selection unit 23d as the second motor electric angle θm2.

Since the abnormality detection signal SAr is the value indicative of being abnormal, the electric angle selection unit 23d outputs the second motor electric angle θm2, input from the sub-motor electric angle detecting circuit 23c, to the control computing device 31 as the motor electric angle θm.

Thus, the control computing device 31 performs drive control (commutation control) on the three-phase electric motor 22 based on the second motor electric angle θm2 estimated by the sub-motor electric angle detecting circuit 23c.

Here, the relative offset amount estimating unit 62 corresponds to an offset amount estimating unit, the motor electric angle estimating unit 63 corresponds to a motor electric angle estimating unit, and the control computing device 31 and the motor electric angle detecting circuit 23 correspond to a motor driving control unit.

Further, the torque sensor 13 corresponds to a torque detection unit, the output-side rotational angle sensor 13c corresponds to a steering angle detecting unit, the three-phase electric motor 22 corresponds to a multi-phase electric motor, and the resolver 23a and the angle computing unit 60 correspond to a motor electric angle detecting unit.

Further, the first and second inverter circuits 42A and 42B correspond to a motor driving circuit, the control computing device 31 corresponds to a control computing device, the resolver abnormality diagnosing unit 61 corresponds to an abnormality diagnosis unit, and the RAM 50 corresponds to a memory.

Effects of First Embodiment (1) In the motor control apparatus 25 according to the first embodiment, the relative offset amount estimating unit 62 estimates the relative offset amount θoff between the reference value θosr of the output shaft rotational angle, detected by the output-side rotational angle sensor 13c that detects the steering angle (output shaft rotational angle detection value θos), and the motor electric angle original point θmd of the three-phase electric motor 22 that generates the steering assist force. The motor electric angle estimating unit 63 estimates the motor electric angle θm based on the output shaft rotational angle detection value θos and the relative offset amount θoff. When the resolver 23a and the angle computing unit 60 are normal, the control computing device 31 and the motor electric angle detecting circuit 23 control the driving of the three-phase electric motor 22 based on the first motor electric angle θm1 detected thereby. On the other hand, when the resolver 23a and the angle computing unit 60 are abnormal, the driving of the three-phase electric motor 22 is controlled based on the second motor electric angle θm2 estimated by the motor electric angle estimating unit 63.

According to this configuration, the relative offset amount θoff between the reference value θosr of the output shaft rotational angle detection value θos, detected by the output-side rotational angle sensor 13c, and the motor electric angle original point θmd of the three-phase electric motor 22 can be estimated to estimate the motor electric angle θm based on the output shaft rotational angle detection value θos and the relative offset amount θoff. Then, when at least either one of the resolver 23a and the angle computing unit 60 is abnormal, the driving of the three-phase electric motor 22 can be controlled based on the estimated motor electric angle θm.

Thus, the driving of the three-phase electric motor 22 can be continued even when at least either one of the resolver 23a and the angle computing unit 60 is abnormal.

(2) In the motor control apparatus 25 according to the first embodiment, the torque sensor 13 detects the steering torque T transmitted to the steering mechanism. The output-side rotational angle sensor 13c detects the steering angle (output shaft rotational angle detection value θos). The three-phase electric motor 22 generates the steering assist force. The resolver 23a and the angle computing unit 60 detect the motor electric angle θm of the three-phase electric motor 22. The first and second inverter circuits 42A and 42B supply drive current to the three-phase electric motor 22. The control computing device 31 controls the driving of the first and second inverter circuits 42A and 42B based on the steering torque T detected by the torque sensor 13 and the motor electric angle θm detected by the resolver 23a and the angle computing unit 60. The resolver abnormality diagnosing unit 61 diagnoses an abnormality of the resolver 23a and the angle computing unit 60. The relative offset amount estimating unit 62 estimates the relative offset amount θoff between the reference value θosr of the output shaft rotational angle detection value and the motor electric angle original point θmd. The motor electric angle estimating unit 63 estimates the motor electric angle θm based on the output shaft rotational angle detection value θos detected by the output-side rotational angle sensor 13c, and the relative offset amount θoff estimated by the relative offset amount estimating unit 62. When the resolver abnormality diagnosing unit 61 diagnoses that at least either one of the resolver 23a and the angle computing unit 60 is abnormal, the control computing device 31 controls the driving of the first and second inverter circuits 42A and 42B based on the steering torque T detected by the torque sensor 13 and the second motor electric angle $\theta m2$ estimated by the motor electric angle estimating unit 63.

According to this configuration, the relative offset amount $\theta$off between the reference value $\theta$osr of the output shaft rotational angle detection value $\theta$os detected by the output-side rotational angle sensor 13c, and the motor electric angle original point $\theta$md of the three-phase electric motor 22 can be estimated to estimate the motor electric angle $\theta m$ based on the output shaft rotational angle detection value $\theta$os and the relative offset amount $\theta$off. Then, when at least either one of the resolver 23a and the angle computing unit 60 is abnormal, the driving of the multi-phase electric motor can be controlled based on the estimated motor electric angle $\theta m2$.

Thus, even when at least either one of the resolver 23a and the angle computing unit 60 is abnormal, the three-phase electric motor 22 can continue to be driven.

(3) In the motor control apparatus 25 according to the first embodiment, when the resolver 23a and the angle computing unit 60 are normal, the relative offset amount estimating unit 62 estimates the first relative offset amount $\theta$off1 based on the output shaft rotational angle detection value $\theta$os detected by the output-side rotational angle sensor 13c, and the motor electric angle $\theta m$ detected by the resolver 23a and the angle computing unit 60, and stores the estimated first relative offset amount $\theta$off1 in the RAM 50. When at least either one of the resolver 23a and the angle computing unit 60 is diagnosed as being abnormal by the resolver abnormality diagnosing unit 61 during system startup, the motor electric angle estimating unit 63 estimates the motor electric angle $\theta m$ based on the output shaft rotational angle detection value $\theta$os detected by the output-side rotational angle sensor 13c and the first relative offset amount $\theta$off1 stored in the RAM 50.

According to this configuration, when the resolver 23a and the angle computing unit 60 are normal, the first relative offset amount $\theta$off1 can be estimated and stored in the RAM 50 based on the output shaft rotational angle detection value $\theta$os detected by the output-side rotational angle sensor 13c, and the motor electric angle $\theta m$ detected by the resolver 23a and the angle computing unit 60.

Therefore, even when an abnormality occurs in at least either one of the resolver 23a and the angle computing unit 60 during system startup, an accurate motor electric angle can be estimated from the first relative offset amount $\theta$off1 stored in the RAM 50.

Thus, even when at least either one of the resolver 23a and the angle computing unit 60 is abnormal during system startup, the three-phase electric motor 22 can continue to be driven.

(4) In the motor control apparatus 25 according to the first embodiment, when at least either one of the resolver 23a and the angle computing unit 60 is diagnosed as being abnormal in the initial diagnosis by the resolver abnormality diagnosing unit 61 at the time of system startup, the relative offset amount estimating unit 62 makes motor drive current oscillating positively and negatively (e.g., stepped wave-like motor drive current) flow into the three-phase electric motor 22 through the control computing device 31 and the first and second inverter circuits 42A and 42B to estimate the motor electric angle original point $\theta$md based on the amplitude of the steering torque T detected by the torque sensor 13 when this motor drive current flows in order to estimate the second relative offset amount $\theta$off2 based on the estimated motor electric angle original point $\theta$md. When at least either one of the resolver 23a and the angle computing unit 60 is diagnosed as being abnormal in the initial diagnosis by the resolver abnormality diagnosing unit 61, the motor electric angle estimating unit 63 estimates the motor electric angle $\theta m$ based on the output shaft rotational angle detection value $\theta$os detected by the output-side rotational angle sensor 13c and the second relative offset amount $\theta$off2.

According to this configuration, when at least either one of the resolver 23a and the angle computing unit 60 is diagnosed as being abnormal in the initial diagnosis at the time of restarting the system, motor drive current oscillating positively and negatively (e.g., stepped wave-like motor drive current) flows into the three-phase electric motor 22 so that the motor electric angle original point $\theta$md can be estimated based on the amplitude of the steering torque T detected by the torque sensor 13 when this motor drive current flows to estimate the second relative offset amount $\theta$off2 based on the estimated motor electric angle original point $\theta$md. Then, the motor electric angle $\theta m$ can be estimated based on this second relative offset amount $\theta$off2.

Thus, even when the system is restarted after at least either one of the resolver 23a and the angle computing unit 60 is diagnosed as being abnormal and the system is once halted, or when an abnormality occurs during system halt, the three-phase electric motor 22 can be driven normally after the system is restarted.

(5) In the motor control apparatus 25 according to the first embodiment, the relative offset amount estimating unit 62 stores the steering torque T, detected by the torque sensor 13 before the second relative offset amount $\theta$off2 is estimated, in the RAM 50 as the torque offset amount Toff, subtracts the torque offset amount Toff from the steering torque T detected by the torque sensor 13 when the stepped wave-like motor drive current flows, and estimates the motor electric angle original point $\theta$md based on the amplitude of the steering torque Tc obtained after the subtraction.

According to this configuration, even when an offset occurs in the steering torque T, such as a case where the driver operates the steering wheel 11 at the time of turning on the IGN switch 28, or a case where the driver rests his arm(s) on the steering wheel 11, the offset amount can be subtracted from the detection value. Thus, even when an offset occurs in the steering torque, the motor electric angle original point $\theta$md can be estimated accurately.

(6) The electric power steering apparatus 3 according to the first embodiment includes the motor control apparatus 25.

According to this configuration, operation and effects equivalent to those of the motor control apparatus 25 described at (1) to (5) above can be obtained. Further, since steering assist control can be continued even when a failure occurs in the resolver 23a and the angle computing unit 60, the reliability of the electric power steering apparatus 3 can be improved.

(7) The vehicle 1 according to the first embodiment includes the electric power steering apparatus 3 provided with the motor control apparatus 25.

According to this configuration, operation and effects equivalent to those of the motor control apparatus 25 described at (1) to (5) above can be obtained. Further, since steering assist control can be continued even when a failure occurs in the resolver 23a, the reliability of the vehicle 1 can be improved.

Second Embodiment

Next, a second embodiment of the present invention will be described.

(Configuration)

The second embodiment differs from the above-mentioned first embodiment in that a second sub-motor electric angle detecting circuit 23e is included instead of the sub-motor electric angle detecting circuit 23c in the motor electric angle detecting circuit 23 of the above-mentioned first embodiment, and the others are configured in the same manner as in the above-mentioned first embodiment.

In the following, the same configuration parts as in the above-mentioned first embodiment are given the same reference numerals to omit the description as appropriate, and different parts will be described in detail.

(Motor Electric Angle Detecting Circuit 23)

Figure 12:
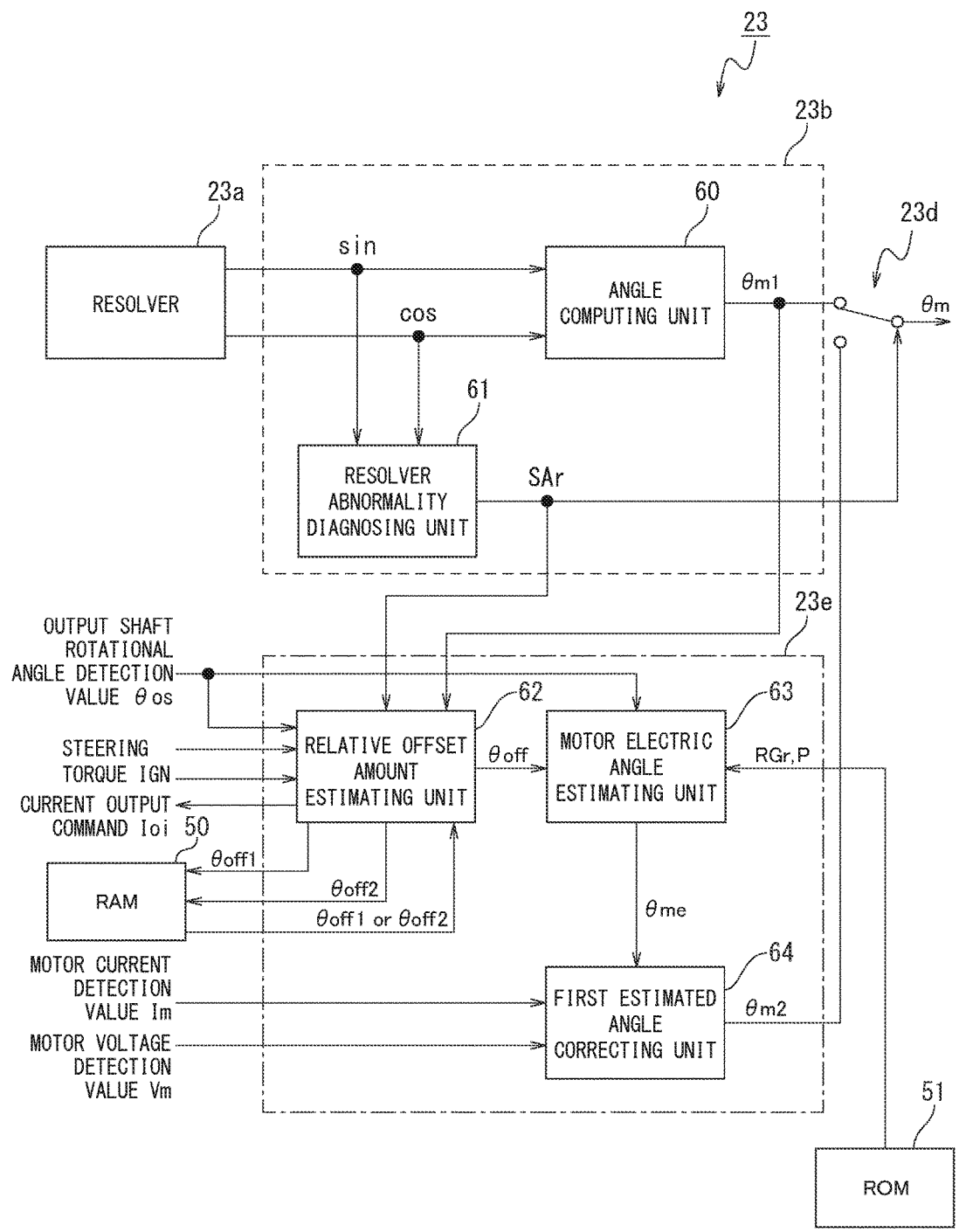
FIG. 12 is a block diagram illustrating a specific configuration example of a motor electric angle detecting circuit according to a second embodiment of the present invention.

As illustrated in FIG. 12, a motor electric angle detecting circuit 23 according to the second embodiment includes the main motor electric angle detecting circuit 23b, a second sub-motor electric angle detecting circuit 23e, the electric angle selection unit 23d, the RAM 50, and the ROM 51.

The output shaft rotational angle detection value θos output from the output-side rotational angle sensor 13c, the steering torque T, and the ignition signal IGN indicative of ignition ON/OFF output from the IGN switch 28 are input to the second sub-motor electric angle detecting circuit 23e. In addition, the first motor electric angle θm1 from the angle computing unit 60, the abnormality detection signal SAr from the resolver abnormality diagnosing unit 61, the motor current detection value Im from the current detection circuits 34A and 34B, and the motor voltage detection value Vm from the voltage detection circuits 40A and 40B are input.

This second sub-motor electric angle detecting circuit 23e includes the relative offset amount estimating unit 62, the motor electric angle estimating unit 63, and a first estimated angle correcting unit 64.

The motor electric angle estimating unit 63 of the second embodiment calculates the motor electric angle estimate θme based on the output shaft rotational angle detection value θos, the reduction ratio RGr, the number P of pole pairs, and the relative offset amount θoff. Then, the calculated motor electric angle estimate θme is output to the first estimated angle correcting unit 64.

The first estimated angle correcting unit 64 corrects the motor electric angle estimate θme based on the back electromotive voltage EMF of the three-phase electric motor 22. Then, the corrected motor electric angle estimate is output to the electric angle selection unit 23d as the second motor electric angle θm2.

(First Estimated Angle Correcting Unit 64)

Figure 13:
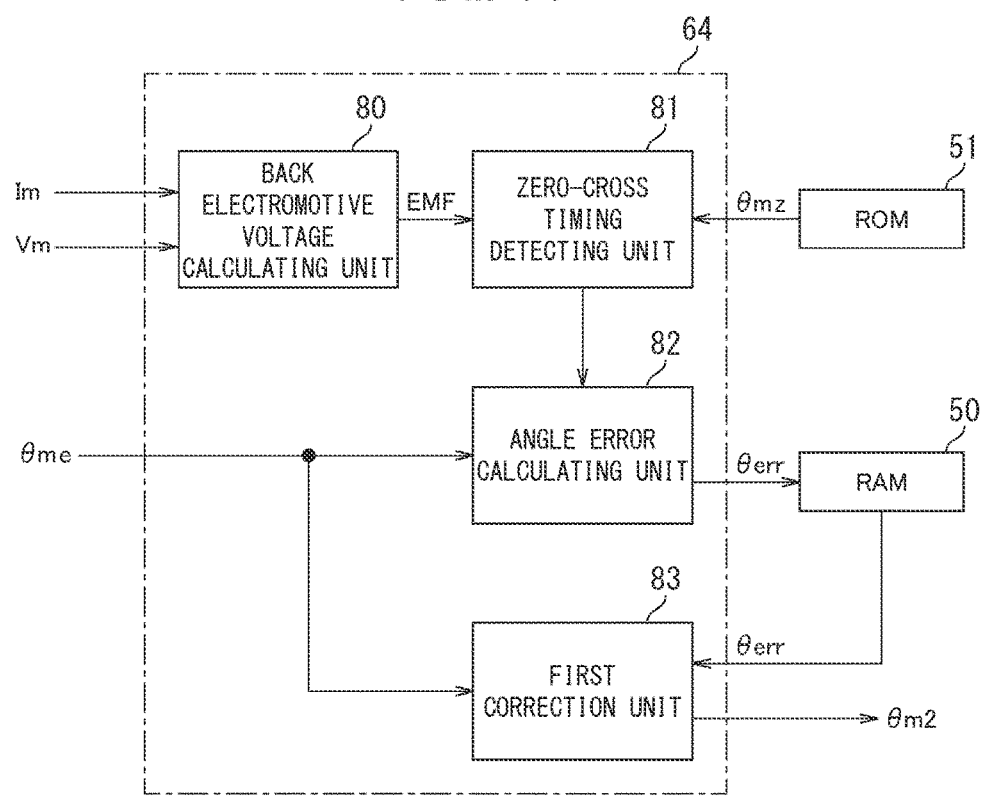
FIG. 13 is a block diagram illustrating a specific configuration of a first estimated angle correcting unit according to the second embodiment of the present invention.

As illustrated in FIG. 13, the first estimated angle correcting unit 64 includes a back electromotive voltage calculating unit 80, a zero-cross timing detecting unit 81, an angular error calculating unit 82, and a first correction unit 83.

Figure 14:
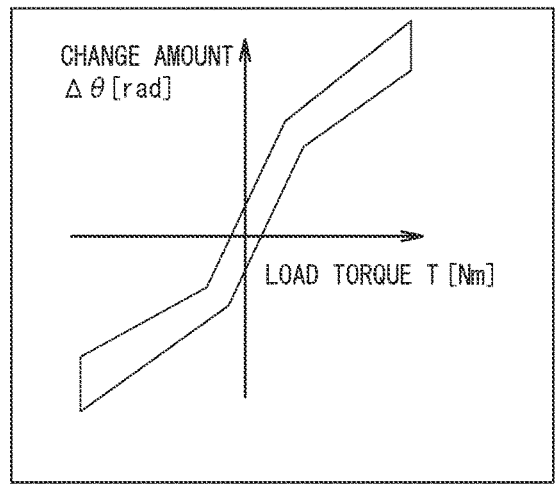
FIG. 14 is a diagram illustrating an example of the relationship between load torque and motor electric angle due to the deformation characteristics of mechanical elements of the electric motor.

Here, mechanical elements including the reduction gear (worm gear) 21 stand between the output-side rotational angle sensor 13c and the three-phase electric motor 22. For example, the compliance of the reduction gear (worm gear) 21 has non-linear characteristics due to backlash or material constraints. Further, the characteristics vary according to aged deterioration, moisture absorption, and temperature change. Because of the characteristics, the motor electric angle θm does not correspond to the output shaft rotational angle detection value θos in a one-to-one manner. As the motor output increases, the error between the motor electric angle estimate θme and the actual motor electric angle θm increases. For example, as illustrated in FIG. 14, the compliance characteristics of the worm gear are non-linear and have hysteresis. In FIG. 14, the X axis represents load torque (motor output torque), and Y axis represents the deformation amount A of the motor electric angle θm.

When such compliance characteristics are not taken into account, a gap between the actual motor electric angle θm and the motor electric angle estimate θme is caused depending on the driving state of the three-phase electric motor 22. Therefore, in the second embodiment, the motor electric angle estimate θme is corrected by the first estimated angle correcting unit 64 based on back electromotive voltage EMF uniquely determined by the motor electric angle θm and the motor rotational speed.

In the second embodiment, the back electromotive voltage calculating unit 80 calculates interphase back electromotive voltage EMF (EMFuv, EMFvw, EMFwu) based on the motor current detection value Im (Imu, Imv, Imw) and the motor voltage detection value Vm (Vmu, Vmv, Vmw). Then, the calculated interphase back electromotive voltage EMF is output to the zero-cross timing detecting unit 81.

Figure 15:
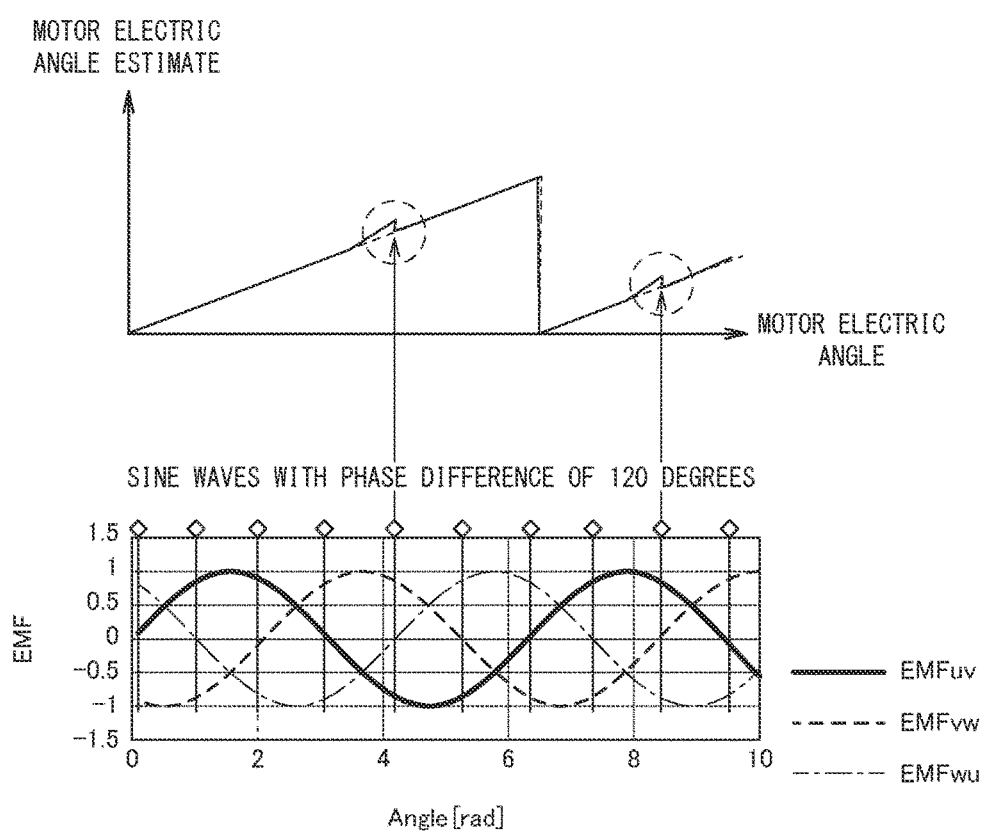
FIG. 15 is a diagram for describing correction of a motor electric angle estimate at zero-cross timing.

The interphase back electromotive voltage EMF is composed of UV-phase back electromotive voltage EMFuv between U-phase and V-phase, VW-phase back electromotive voltage EMFvw between V-phase and W-phase, and WU-phase back electromotive voltage EMFwu between W-phase and U-phase, appearing as positive and negative values with reference to 0. Specifically, for example, sine waves with a phase difference of 120 degrees as illustrated in the lower part of FIG. 15 are obtained. In the lower part of FIG. 15, the solid line represents the UV-phase back electromotive voltage EMFuv, the broken line represents the VW-phase back electromotive voltage EMFvw, and the dot-and-dash line represents the WU-phase back electromotive voltage EMFwu.

The zero-cross timing detecting unit 81 detects zero-cross timings as timings at which the UV-phase back electromotive voltage EMFuv, the VW-phase back electromotive voltage EMFvw, and the WU-phase back electromotive voltage EMFwu become zero. Specifically, a point becomes each of the zero-cross points, at which a vertical line extending from each upper end portion indicated by the rhombic mark in the lower part of FIG. 15, and a horizontal line on which the vertical line becomes zero intersects.

Specifically, the zero-cross timing detecting unit 81 of the first embodiment detects, as the zero-cross timing, timing at which each of the sign of the UV-phase back electromotive voltage EMFuv, the VW-phase back electromotive voltage EMFvw, and the WU-phase back electromotive voltage EMFwu changes from negative to positive or positive to negative. Then, a motor electric angle θmz corresponding to the detected zero-cross timing (zero-cross point) is read from the ROM 51, and the read motor electric angle θmz is output to the angular error calculating unit 82.

In other words, in the first embodiment, since the motor electric angle at each of the zero-cross points of the UV-phase back electromotive voltage EMFuv, the VW-phase back electromotive voltage EMFvw, and the WU-phase back electromotive voltage EMFwu is a known value, the motor electric angle θmz corresponding to each zero-cross point is prestored in the ROM 51.

The angular error calculating unit 82 calculates a difference between the motor electric angle θmz corresponding to the zero-cross point input from the zero-cross timing detecting unit 81, and the motor electric angle estimate θme input from the motor electric angle estimating unit 63, and stores the calculated difference in the RAM 50 as an angular error θerr.

The angular error calculating unit 82 updates the angular error θerr stored in the RAM 50 each time zero-cross timing is detected. As illustrated in the lower part of FIG. 15, the zero-cross timing appears six times per one cycle (360 degrees) of the motor electric angle θm. Thus, the angular error θerr can be updated in each cycle of the 60-degree electric angle.

The first correction unit 83 uses the angular error θerr stored in the RAM 50 to correct the motor electric angle estimate θme input from the motor electric angle estimating unit 63, and outputs the corrected motor electric angle estimate to the electric angle selection unit 23d as the second motor electric angle θm2.

For example, as illustrated in the upper part of FIG. 15, a motor electric angle estimate θme having an error encircled by a dotted line and corresponding to a zero-cross point illustrated in the lower part of FIG. 15 is corrected by an angular error θerr between the motor electric angle estimate θme and a known motor electric angle θm corresponding to the zero-cross point. Then, the motor electric angle estimate θme is corrected by this angular error θerr at every correction timing until the next zero-cross point is detected. In other words, the first correction unit 83 makes the correction using the angular error θerr currently stored in the RAM 50 until the next zero-cross timing is detected.

(Operation)

Next, operation of the above-mentioned second embodiment will be described.

In the deactivated state, where not only the IGN switch 28 is in the off state and hence the vehicle 1 is stopped, but also the steering assist control processing is stopped, the control computing device 31 and the motor electric angle detecting circuit 23 in the motor control apparatus 25 are in an inactive state.

Therefore, various processes to be executed by the control computing device 31 and the motor electric angle detecting circuit 23 are stopped. In this state, the three-phase electric motor 22 is deactivated, and the steering assist force to the steering mechanism is stopped.

When the IGN switch 28 is turned on from this deactivated state, the control computing device 31 and the motor electric angle detecting circuit 23 are put into an active state to start various processes such as the detection processing of the motor electric angle θm and the steering assist control processing. At this time, it is assumed that the resolver 23a and the angle computing unit 60 are normal.

In this case, the abnormality detection signal SAr becomes the value indicative of no abnormality, and the electric angle selection unit 23d outputs the first motor electric angle θm1 computed by the angle computing unit 60 to the control computing device 31 as the motor electric angle θm.

Based on this motor electric angle θm, the control computing device 31 calculates the d-axis current command value Id* and the q-axis current command value Iq*. Then, based on the d-axis current command value Id* and the q-axis current command value Iq*, the control computing device 31 calculates the three-phase voltage command values V1* and V2* for the first and second motor driving circuits 32A and 32B, and outputs the calculated three-phase voltage command values V1* and V2* to the first and second motor driving circuits 32A and 32B. Thus, the first and second motor driving circuits 32A and 32B control the driving of the first and second inverter circuits 42A and 42B to perform drive control (commutation control) on the three-phase electric motor 22.

In the meantime, when the resolver 23a and the angle computing unit 60 are normal, the relative offset amount estimating unit 62 in the second sub-motor electric angle detecting circuit 23e performs estimation processing of the first relative offset amount θoff1. In other words, based on the output shaft rotational angle detection value θos detected by the normal-time output-side rotational angle sensor 13c, and the motor electric angle θm output from the main motor electric angle detecting circuit 23b, the first relative offset amount θoff1 is estimated, and the estimated first relative offset amount θoff1 is stored in the RAM 50.

Then, when the resolver 23a and the angle computing unit 60 are normal, the relative offset amount estimating unit 62 of the second embodiment outputs the first relative offset amount θoff1 stored in the RAM 50 to the motor electric angle estimating unit 63 as the relative offset amount θoff.

When the resolver 23a and the angle computing unit 60 are normal, the motor electric angle estimating unit 63 calculates the motor electric angle estimate θme from the output shaft rotational angle detection value θos detected by the output-side rotational angle sensor 13c, the first relative offset amount θoff1, the reduction ratio RGr (e.g., 20.5), and magnetic pole pairs (e.g., 4). Then, the motor electric angle estimate θme is output to the first estimated angle correcting unit 64.

The first estimated angle correcting unit 64 calculates interphase back electromotive voltage EMF (EMFuv, EMFvw, EMFwu) from the motor current detection value Im and the motor voltage detection value Vm to detect zero-cross timing. Then, the motor electric angle θmz at the zero-cross point is acquired from the ROM 51 to calculate the angular error θerr from a difference between the motor electric angle estimate θme and the motor electric angle θmz. Then, the calculated angular error θerr is overwritten and stored in the RAM 50. Further, the first estimated angle correcting unit 64 uses the angular error θerr stored in the RAM 50 to correct the motor electric angle estimate θme, and outputs the corrected motor electric angle estimate θme to the electric angle selection unit 23d as the second motor electric angle θm2.

After that, when a failure occurs in at least either one of the resolver 23a and the angle computing unit 60 during system startup so that the abnormality detection signal SAr will become the value indicative of being abnormal, the electric angle selection unit 23d outputs the second motor electric angle θm2, input from the sub-motor electric angle detecting circuit 23c, to the control computing device 31 as the motor electric angle θm.

Thus, based on the second motor electric angle θm2 estimated by the second sub-motor electric angle detecting circuit 23e, the control computing device 31 performs drive control (commutation control) on the three-phase electric motor 22.

Suppose then that the IGN switch 28 is once turned off to halt the system, and after that, the IGN switch 28 is turned on again to restart the system.

In this case, the abnormality detection signal SAr becomes the value indicative of being abnormal in the initial diagnosis by the resolver abnormality diagnosing unit 61 after the system is restarted, and the relative offset amount estimating unit 62 performs estimation processing of the second relative offset amount θoff2.

Specifically, the relative offset amount estimating unit 62 first acquires the steering torque T after the initial diagnosis and stores the steering torque T in the RAM 50 as the torque offset amount Toff. Subsequently, assuming that the default value of the assumed angle X is 180 degrees here, the current output command Ioi is output to the control computing device 31 to input stepped wave-like motor drive current corresponding to 180 degrees to the three-phase electric motor 22. Thus, the stepped wave-like motor drive current corresponding to 180 degrees flows into the three-phase electric motor 22.

Then, the steering torque T detected by the torque sensor 13 in response to input of the stepped wave-like motor drive current is acquired, and the torque offset amount Toff is subtracted from this steering torque T to determine the symmetry of the torque waveform of the steering torque Tc after the subtraction. Here, it is assumed that the determination result is asymmetric. In this case, the second relative offset amount estimating unit 71 determines a shift direction from the shape of the asymmetric torque waveform to update the assumed angle X in a direction to make the shift smaller.

For example, when the actual motor electric angle θm is 0 degrees, since a 180-degree response waveform is a waveform shifted from 0 degrees in a direction of 360 degrees, the assumed angle X is next updated, for example, to 90 degrees as an intermediate value between 0 degrees and 180 degrees. Then, stepped wave-like motor drive current corresponding to 90 degrees is input to the three-phase electric motor 22 to determine the symmetry of a torque waveform again from response torque. In this case, since the 90-degree response waveform is a waveform shifted from 0 degrees in the 360-degree direction, such processing as to update the assumed angle X next to 45 degrees as an intermediate value between 0 degrees and 90 degrees is repeated until the positive and negative amplitudes of the response torque waveform become equivalent.

Then, an assumed angle X when the positive and negative amplitudes are equivalent is set as the motor electric angle original point θmd. Note that the amplitudes may be determined to be equivalent, for example, when a difference between the positive and negative amplitudes falls within a preset error range, as well as the case where the positive and negative amplitudes become exactly the same amplitude.

The relative offset amount estimating unit 62 calculates the second relative offset amount θoff2 from the estimated motor electric angle original point θmd, and the reference value θosr of the acquired output shaft rotational angle detection value at the time of restarting the system. Then, the calculated second relative offset amount θoff2 is stored in the RAM 50.

Further, as a result of the fact that the abnormality detection signal SAr becomes the value indicative of being abnormal at the time of restarting the system, the relative offset amount estimating unit 62 reads the second relative offset amount θoff2 from the RAM 50, and outputs the read second relative offset amount θoff2 to the motor electric angle estimating unit 63 as the relative offset amount θoff.

Thus, the motor electric angle estimating unit 63 calculates the motor electric angle estimate θme from the output shaft rotational angle detection value θos detected by the output-side rotational angle sensor 13c, the second relative offset amount θoff2, the reduction ratio RGr (e.g., 20.5), and the magnetic pole pairs (e.g., 4). Then, the calculated motor electric angle estimate θme is output to the first estimated angle correcting unit 64.

Like in the case of using the first relative offset amount θoff1 mentioned above, the first estimated angle correcting unit 64 corrects the motor electric angle estimate θme by the angular error θerr, and outputs the corrected motor electric angle estimate to the electric angle selection unit 23d as the second motor electric angle θm2.

Since the abnormality detection signal SAr is the value indicative of being abnormal, the electric angle selection unit 23d outputs the second motor electric angle θm2, input from the second sub-motor electric angle detecting circuit 23e, to the control computing device 31 as the motor electric angle θm.

Thus, the control computing device 31 performs drive control (commutation control) on the three-phase electric motor 22 based on the second motor electric angle θm2 estimated by the second sub-motor electric angle detecting circuit 23e.

Here, the motor electric angle estimating unit 63 corresponds to a motor electric angle estimating unit, and the control computing device 31 and the motor electric angle detecting circuit 23 correspond to a motor driving control unit.

Further, the torque sensor 13 corresponds to a torque detection unit, the output-side rotational angle sensor 13c corresponds to a steering angle detecting unit, the three-phase electric motor 22 corresponds to a multi-phase electric motor, and the resolver 23a and the angle computing unit 60 correspond to a motor electric angle detecting unit.

Further, the first and second inverter circuits 42A and 42B correspond to a motor driving circuit, the control computing device 31 corresponds to a control computing device, the resolver abnormality diagnosing unit 61 corresponds to an abnormality diagnosis unit, the first estimated angle correcting unit 64 corresponds to a motor electric angle correcting unit, and the zero-cross timing detecting unit 81 corresponds to a cross timing detecting unit.

Effects of Second Embodiment

In addition to the effects of the above-mentioned first embodiment, the second embodiment has the following effects.

(1) In the motor control apparatus 25 according to the second embodiment, the motor electric angle estimating unit 63 estimates the motor electric angle θm based on the output shaft rotational angle detection value θos detected by the output-side rotational angle sensor 13c that detects the steering angle (output shaft rotational angle detection value θos). When the resolver 23a and the angle computing unit 60 are normal, the control computing device 31 and the motor electric angle detecting circuit 23 control the driving of the three-phase electric motor 22 based on the first motor electric angle θm1 detected thereby. On the other hand, when the resolver 23a and the angle computing unit 60 are abnormal, the driving of the three-phase electric motor 22 is controlled based on the second motor electric angle θm2 (the value after the correction by the first estimated angle correcting unit 64) estimated by the motor electric angle estimating unit 63.

According to this configuration, the motor electric angle θm can be estimated based on the output shaft rotational angle detection value θos detected by the output-side rotational angle sensor 13c. Then, when at least either one of the resolver 23a and the angle computing unit 60 is abnormal, the driving of the multi-phase electric motor can be controlled based on the estimated motor electric angle θm2.

Thus, the driving of the three-phase electric motor 22 can be continued even when at least either one of the resolver 23a and the angle computing unit 60 is abnormal.

(2) In the motor control apparatus 25 according to the second embodiment, the torque sensor 13 detects the steering torque T transmitted to the steering mechanism. The output-side rotational angle sensor 13c detects the steering angle (output shaft rotational angle detection value θos). The three-phase electric motor 22 generates the steering assist force. The resolver 23a and the angle computing unit 60 detect the motor electric angle θm of the three-phase electric motor 22. The first and second inverter circuits 42A and 42B supply drive current to the three-phase electric motor 22. The control computing device 31 controls the driving of the first and second inverter circuits 42A and 42B based on the steering torque T detected by the torque sensor 13 and the motor electric angle θm detected by the resolver 23a and the angle computing unit 60. The resolver abnormality diagnosing unit 61 diagnoses an abnormality in the resolver 23a and the angle computing unit 60. The motor electric angle estimating unit 63 estimates the motor electric angle θm based on the output shaft rotational angle detection value θos detected by the output-side rotational angle sensor 13c. When the resolver abnormality diagnosing unit 61 diagnoses that at least either one of the resolver 23a and the angle computing unit 60 is abnormal, the control computing device 31 controls the driving of the first and second inverter circuits 42A and 42B based on the steering torque T detected by the torque sensor 13 and the second motor electric angle θm2 (the value after the correction by the first estimated angle correcting unit 64) estimated by the motor electric angle estimating unit 63.

According to this configuration, the motor electric angle θm can be estimated based on the output shaft rotational angle detection value θos detected by the output-side rotational angle sensor 13c. Then, when at least either one of the resolver 23a and the angle computing unit 60 is abnormal, the driving of the multi-phase electric motor can be controlled based on the estimated motor electric angle θm2.

Thus, even when at least either one of the resolver 23a and the angle computing unit 60 is abnormal, the three-phase electric motor 22 can continue to be driven.

(3) In the motor control apparatus 25 according to the second embodiment, the first estimated angle correcting unit 64 corrects the motor electric angle estimate θme based on the back electromotive voltage EMF of the three-phase electric motor 22.

According to this configuration, the motor electric angle estimate can be corrected based on the back electromotive voltage EMF uniquely determined by the motor electric angle and the motor rotational speed. This can reduce errors due to deformation of the mechanical elements such as the reduction gear 21 standing between the output-side rotational angle sensor 13c and the three-phase electric motor 22.

(4) In the motor control apparatus 25 according to the second embodiment, the zero-cross timing detecting unit 81 detects timing at which each phase of the back electromotive voltage waveform of the three-phase electric motor 22 crosses zero. When the zero-cross timing detecting unit 81 detects the zero-cross timing, the first estimated angle correcting unit 64 corrects the motor electric angle estimate θme based on motor electric angle information corresponding to the zero-cross point.

According to this configuration, the zero-cross point of the back electromotive voltage waveform for which the motor electric angle is known can be detected to correct the motor electric angle estimate based on the motor electric angle information corresponding to the detected zero-cross point. This can accurately reduce errors due to deformation of the mechanical elements such as the reduction gear 21 standing between the output-side rotational angle sensor 13c and the three-phase electric motor 22.

(5) The electric power steering apparatus 3 according to the second embodiment includes the motor control apparatus 25.

According to this configuration, operation and effects equivalent to those of the motor control apparatus 25 described at (1) to (4) above can be obtained. Further, since steering assist control can be continued even when a failure occurs in the resolver 23a and the angle computing unit 60, the reliability of the electric power steering apparatus 3 can be improved.

(6) The vehicle 1 according to the second embodiment includes the electric power steering apparatus 3 provided with the motor control apparatus 25.

According to this configuration, operation and effects equivalent to those of the motor control apparatus 25 described at (1) to (4) above can be obtained. Further, since steering assist control can be continued even when a failure occurs in the resolver 23a, the reliability of the vehicle 1 can be improved.

Third Embodiment

Next, a third embodiment of the present invention will be described.

(Configuration)

This third embodiment differs from the above-mentioned second embodiment in that a second estimated angle correcting unit 65 is included instead of the first estimated angle correcting unit 64 in the second sub-motor electric angle detecting circuit 23e of the above-mentioned second embodiment, and the others are configured in the same manner as in the above-mentioned second embodiment.

In the following, the same configuration parts as in the above-mentioned second embodiment are given the same reference numerals to omit the description as appropriate, and different parts will be described in detail.

(Second Estimated Angle Correcting Unit 65)

Figure 16:
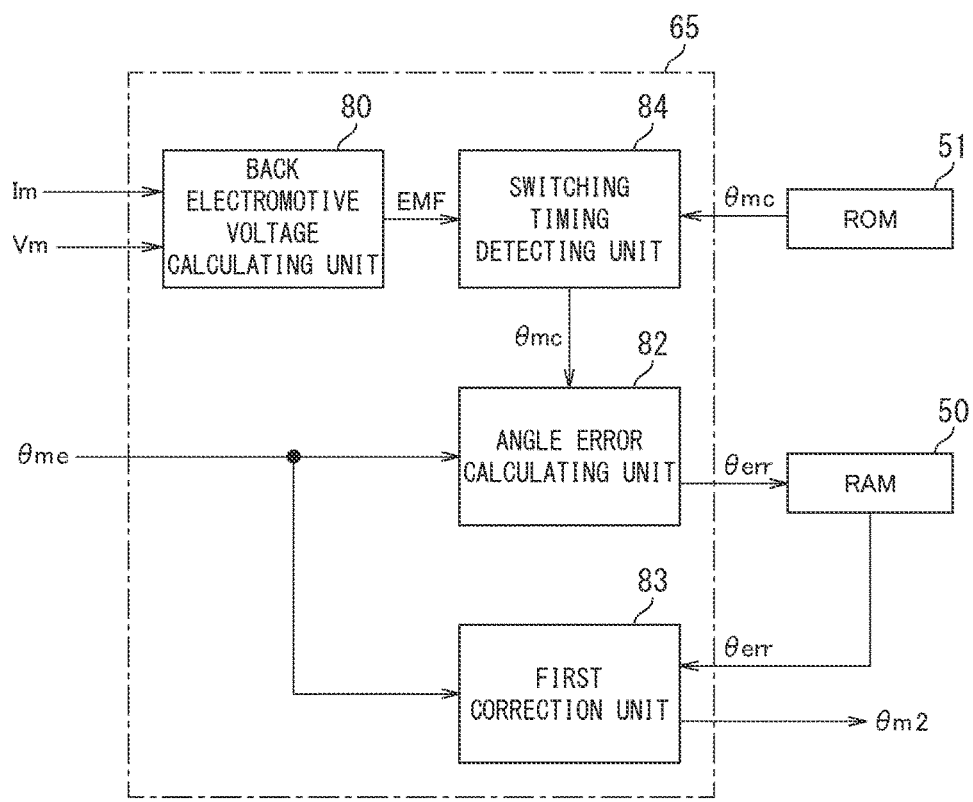
FIG. 16 is a block diagram illustrating a specific configuration of a second estimated angle correcting unit according to a third embodiment of the present invention.

As illustrated in FIG. 16, the second estimated angle correcting unit 65 of the third embodiment includes a back electromotive voltage calculating unit 80, a switching timing detection unit 84, an angular error calculating unit 82, and a first correction unit 83. In other words, the second estimated angle correcting unit 65 has a configuration similar to the first estimated angle correcting unit 64 of the above-mentioned second embodiment except that the switching timing detection unit 84 is included instead of the zero-cross timing detecting unit 81 in the first estimated angle correcting unit 64 of the above-mentioned second embodiment.

The switching timing detection unit 84 detects timing at which a combination of the magnitude relationship of the amplitudes (absolute values) of respective interphase back electromotive voltage waveforms when the three-phase electric motor 22 rotates in the forward direction and the reverse direction, and the sign relationship of respective interphase back electromotive voltage values is switched to any other combination of the magnitude relationship and the sign relationship.

Here, the magnitude relationship and the sign relationship of the amplitudes of interphase back electromotive voltage waveforms illustrated in FIGS. 17(a) and (c) become constant in a certain angle range (range of 30 degrees) as illustrated in FIGS. 17(b) and (d). In FIGS. 17(a) and (c), the solid line indicates the UV-phase back electromotive voltage EMFuv, the broken line indicates the VW-phase back electromotive voltage EMFvw, and the dot-and-dash line indicates the WU-phase back electromotive voltage EMFwu.

For example, in a range of motor electric angles of 0 to 30 degrees during the forward rotation, the VW-phase back electromotive voltage EMFvw becomes the largest ("large" in FIG. 17(b)), the WU-phase back electromotive voltage EMFwu becomes the second largest ("medium" in FIG. 17(b)), and the UV-phase back electromotive voltage EMFuv becomes the smallest ("small" in FIG. 17(b)).

In a range of motor electric angles of 180 to 210 degrees during the forward rotation, the magnitude relationship of amplitudes is the same as that in the range of motor electric angles of 0 to 30 degrees. In other words, the same magnitude relationship appears twice in a range of motor electric angles of 0 to 360 degrees. The same holds true for other magnitude relationships, and the same magnitude relationship appears twice even when the motor rotating direction is the reverse direction.

When focusing attention on the sign, the UV-phase back electromotive voltage EMFuv is "+," the VW-phase back electromotive voltage EMFvw is "−," and the WU-phase back electromotive voltage EMFwu is "+" in the range of motor electric angles 0 to 30 degrees during the forward rotation.

Further, in the range of motor electric angles of 180 to 210 degrees during the forward rotation, the UV-phase back electromotive voltage EMFuv is "−," the VW-phase back electromotive voltage EMFvw is "+," and the WU-phase back electromotive voltage EMFwu is "−."

In other words, the sign relationship is different even in the same magnitude relationship of amplitudes. The same holds true for other magnitude relationships, and the same applies to the case where the motor rotating direction is the reverse direction.

As described above, an angular range can be determined uniquely from a combination of the magnitude relationship of the amplitudes (absolute values) of respective interphase back electromotive voltage waveforms and the sign relationship of respective interphase back electromotive voltage values.

Based on this fact, in the third embodiment, a motor electric angle in a boundary position at the moment when the present combination of the magnitude relationship and the sign relationship is switched to any other combination of the magnitude relationship and the sign relationship is set as the present motor electric angle θm to correct the motor electric angle estimate θme using this motor electric angle θm.

For example, when a combination of the magnitude relationship and the sign relationship, which corresponds to an angular range of 60 degrees to 90 degrees, is switched to a combination of the magnitude relationship and the sign relationship, which corresponds to an angular range of 90 degrees to 120 degrees, the present motor electric angle θm is set to 90 degrees. Further, for example, when a combination of the magnitude relationship and the sign relationship, which corresponds to an angular range of 120 degrees to 150 degrees, is switched to a combination of the magnitude relationship and the sign relationship, which corresponds to the angular range of 90 degrees to 120 degrees, the present motor electric angle θm is set to 120 degrees.

In the third embodiment, map data on each combination of the magnitude relationship of the amplitudes (absolute values) of respective interphase back electromotive voltage waveforms and the sign relationship of respective interphase back electromotive voltage values illustrated in FIGS. 17(b) and (d) are prestored in the ROM 51.

Then, the switching timing detection unit 84 reads, from the ROM 51, a motor electric angle θm (which may be referred to as the "motor electric angle θmc" below) corresponding to the motor rotating direction and combinations of the magnitude relationship and the sign relationship before and after the switching timing, and outputs the read motor electric angle θmc to the angular error calculating unit 82.

The angular error calculating unit 82 of the third embodiment calculates a difference between the motor electric angle θmc corresponding to a switching point input from the switching timing detection unit 84 and the motor electric angle estimate θme input from the motor electric angle estimating unit 63, and stores the calculated difference in the RAM 50 as the angular error θerr.

Figure 18:
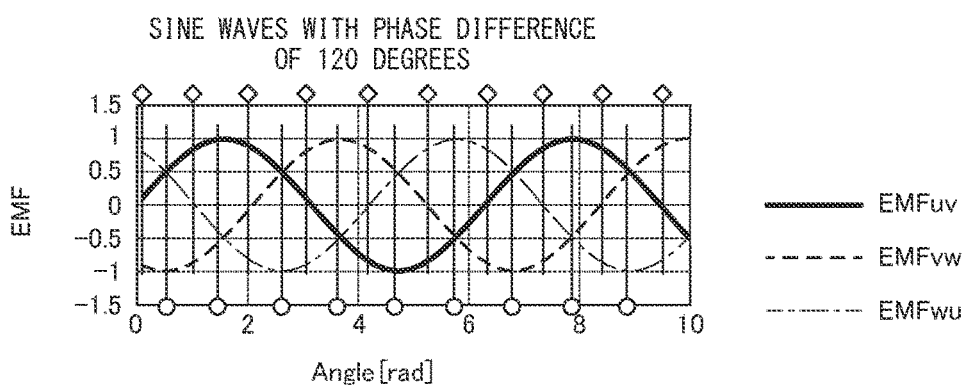
FIG. 18 is a diagram illustrating switching timings of the magnitude relationship and the signs of the interphase back electromotive voltage waveforms.

The angular error calculating unit 82 of the third embodiment updates the angular error θerr stored in the RAM 50 each time switching timing is detected. As illustrated in FIG. 18, this switching timing appears twelve times per one cycle of the motor electric angle θm (360 degrees) as indicated by switching points as intersection points between straight lines, extending from the end portions of the upper rhombic marks and the end portions of the lower round marks, and respective interphase back electromotive voltage waveforms. Thus, the angular error θerr can be updated in each cycle of the 30-degree electric angle.

The first correction unit 83 of the third embodiment uses the angular error θerr stored in the RAM 50 at the previous switching timing to make a correction at every correction timing until the next switching timing is detected.

Here, the motor electric angle estimating unit 63 corresponds to a motor electric angle estimating unit, and the control computing device 31 and motor electric angle detecting circuit 23 correspond to a motor driving control unit.

Further, the torque sensor 13 corresponds to a torque detection unit, the output-side rotational angle sensor 13c corresponds to a steering angle detecting unit, the three-phase electric motor 22 corresponds to a multi-phase electric motor, and the resolver 23a and the angle computing unit 60 correspond to a motor electric angle detecting unit.

Further, the first and second inverter circuits 42A and 42B corresponds to a motor driving circuit, the control computing device 31 corresponds to a control computing device, the resolver abnormality diagnosing unit 61 corresponds to an abnormality diagnosis unit, the second estimated angle correcting unit 65 corresponds to a motor electric angle correcting unit, and the switching timing detection unit 84 corresponds to a switching timing detection unit.

Effects of Third Embodiment

In addition to the effects of the above-mentioned second embodiment, the third embodiment has the following effects.

(1) The switching timing detection unit 84 detects timing at which a combination of the magnitude relationship and the sign relationship of respective phases of back electromotive voltage waveforms of the three-phase electric motor 22 is switched to any other combination of the magnitude relationship and the sign relationship. When the switching timing detection unit 84 detects the switching timing, the second estimated angle correcting unit 65 corrects the motor electric angle estimate θme based on motor electric angle information (motor electric angle θmc) corresponding to the switching point.

According to this configuration, the switching point of the back electromotive voltage waveform for which the motor electric angle is known can be detected to correct the motor electric angle estimate based on the motor electric angle information corresponding to the detected switching point. This can accurately reduce errors due to deformation of the mechanical elements such as the reduction gear 21 standing between the output-side rotational angle sensor 13c and the three-phase electric motor 22.

Fourth Embodiment

Next, a fourth embodiment of the present invention will be described.

(Configuration)

This fourth embodiment differs from the above-mentioned second embodiment in that a third estimated angle correcting unit 66 is included instead of the first estimated angle correcting unit 64 in the second sub-motor electric angle detecting circuit 23e of the above-mentioned second embodiment, and the others are configured in the same manner as in the above-mentioned second embodiment.

In the following, the same configuration parts as in the above-mentioned second embodiment are given the same reference numerals to omit the description as appropriate, and different parts will be described in detail.

(Third Estimated Angle Correcting Unit 66)

Figure 19:
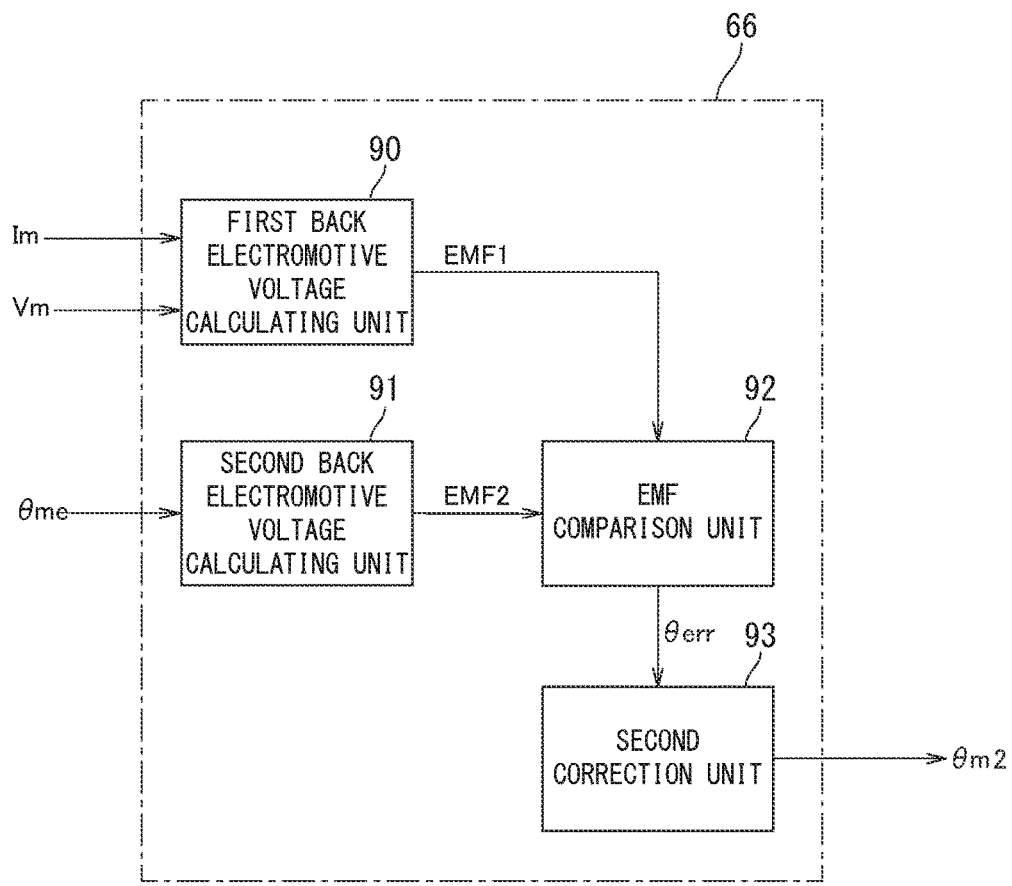
FIG. 19 is a block diagram illustrating a specific configuration of a third estimated angle correcting unit according to a fourth embodiment of the present invention.

As illustrated in FIG. 19, the third estimated angle correcting unit 66 of the fourth embodiment includes a first back electromotive voltage calculating unit 90, a second back electromotive voltage calculating unit 91, an EMF comparison unit 92, and a second correction unit 93.

The motor current detection value Im from the current detection circuits 34A and 34B and the motor voltage detection value Vm from the voltage detection circuits 40A and 40B are input to the first back electromotive voltage calculating unit 90.

Then, the first back electromotive voltage calculating unit 90 calculates a first back electromotive voltage EMF1 based on the input motor current detection value Im and motor voltage detection value Vm. Like the back electromotive voltage calculating unit 80 in the above-mentioned first embodiment, interphase back electromotive voltage may be calculated. The first back electromotive voltage calculating unit 90 outputs the calculated first back electromotive voltage EMF1 to the EMF comparison unit 92.

The second back electromotive voltage calculating unit 91 calculates a second back electromotive voltage EMF2 corresponding to the first back electromotive voltage EMF1 based on the motor electric angle estimate θme estimated by the motor electric angle estimating unit 63. In other words, when the first back electromotive voltage EMF1 is interphase back electromotive voltage, the interphase back electromotive voltage is calculated. The second back electromotive voltage calculating unit 91 outputs the calculated second back electromotive voltage EMF2 to the EMF comparison unit 92.

The EMF comparison unit 92 calculates an amplitude difference between the first back electromotive voltage EMF1 and the second back electromotive voltage EMF2 to calculate a phase difference between the first back electromotive voltage EMF1 and the second back electromotive voltage EMF2 based on the amplitude difference.

Figure 20:
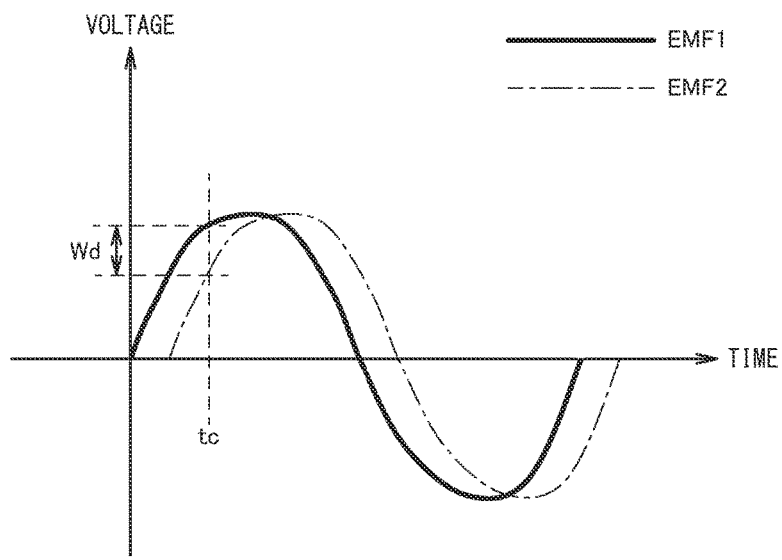
FIG. 20 is a waveform diagram illustrating an example of the relationship between an waveform of first back electromotive voltage EMF1 and an waveform of second back electromotive voltage EMF2.

For example, suppose that as illustrated in FIG. 20 the first back electromotive voltage EMF1 and the second back electromotive voltage EMF2 have a relationship of a waveform of the first back electromotive voltage EMF1 indicated by the solid line in the figure and a waveform of the second back electromotive voltage EMF2 indicated by the dot-and-dash line in the figure.

For example, as illustrated in FIG. 20, the EMF comparison unit 92 calculates an amplitude difference Wd at correction timing tc. In this case, since the first back electromotive voltage EMF1 and the second back electromotive voltage EMF2 draw sine waves, the phase difference between the first back electromotive voltage EMF1 and the second back electromotive voltage EMF2 is calculated using, for example, a trigonometric function. Then, this phase difference is output to the second correction unit 93 as the angular error θerr.

The second correction unit 93 uses the angular error θerr input from the EMF comparison unit 92 to correct the motor electric angle estimate θme estimated by the motor electric angle estimating unit 63. Then, the corrected motor electric angle estimate is output to the electric angle selection unit 23d as the second motor electric angle θm2.

Note that the third estimated angle correcting unit 66 of the fourth embodiment performs calculation processing of the first back electromotive voltage EMF1 and the second back electromotive voltage EMF2, and calculation processing of the angular error θerr based on the first back electromotive voltage EMF1 and the second back electromotive voltage EMF2 at each correction timing. Then, the correction is made using the angular error θerr calculated at each correction timing.

Here, the motor electric angle estimating unit 63 corresponds to a motor electric angle estimating unit, and the control computing device 31 and the motor electric angle detecting circuit 23 correspond to a motor driving control unit.

Further, the torque sensor 13 corresponds to a torque detection unit, the output-side rotational angle sensor 13c corresponds to a steering angle detecting unit, the three-phase electric motor 22 corresponds to a multi-phase electric motor, and the resolver 23a and the angle computing unit 60 correspond to a motor electric angle detecting unit.

Further, the first and second inverter circuits 42A and 42B correspond to a motor driving circuit, the control computing device 31 corresponds to a control computing device, the resolver abnormality diagnosing unit 61 corresponds to an abnormality diagnosis unit, and the third estimated angle correcting unit 66 corresponds to a motor electric angle correcting unit.

Effects of Fourth Embodiment

In addition to the effects of the above-mentioned second embodiment, the fourth embodiment has the following effects.

(1) In the motor control apparatus 25 according to the fourth embodiment, the third estimated angle correcting unit 66 corrects the motor electric angle estimate θme based on the phase difference or amplitude difference between the first back electromotive voltage EMF1, calculated based on the motor voltage detection value Vm and the motor current detection value Im of the three-phase electric motor 22, and the second back electromotive voltage EMF2, calculated based on the motor electric angle estimate θme.

According to this configuration, the correction can be made every time at each correction timing, and hence a more accurate motor electric angle estimate θme can be obtained.

Fifth Embodiment

Next, a fifth embodiment of the present invention will be described.

(Configuration)

This fifth embodiment differs from the above-mentioned second embodiment in that a fourth estimated angle correcting unit 67 is included instead of the first estimated angle correcting unit 64 in the second sub-motor electric angle detecting circuit 23e of the above-mentioned second embodiment, and the others are configured in the same manner as in the above-mentioned second embodiment.

In the following, the same configuration parts as in the above-mentioned second embodiment are given the same reference numerals to omit the description as appropriate, and different parts will be described in detail.

(Fourth Estimated Angle Correcting Unit 67)

Figure 21:
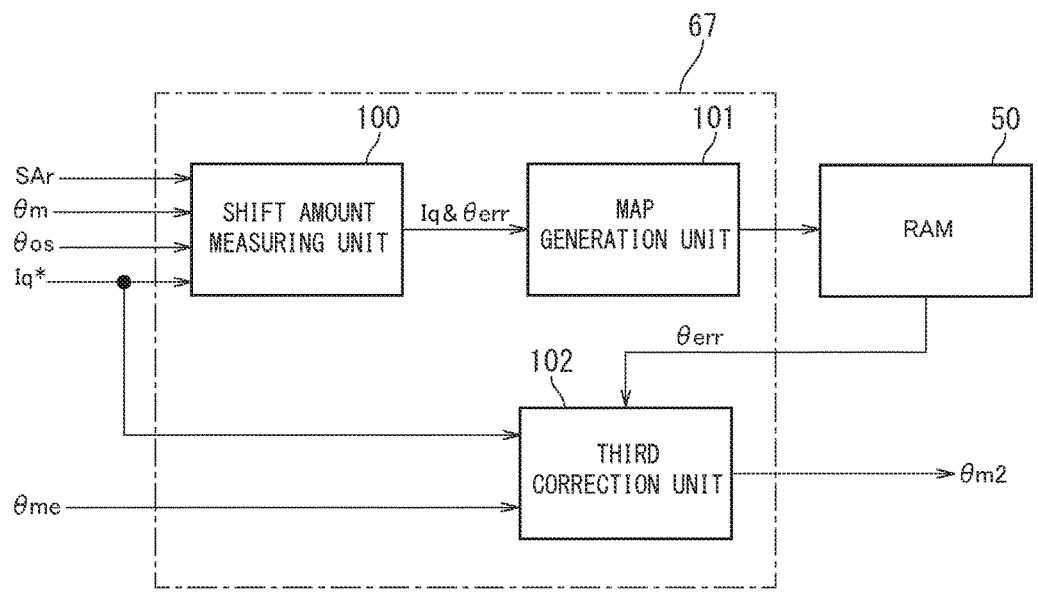
FIG. 21 is a block diagram illustrating a specific configuration of a fourth estimated angle correcting unit according to a fifth embodiment of the present invention.

As illustrated in FIG. 21, the fourth estimated angle correcting unit 67 of the fifth embodiment includes a shift amount measuring unit 100, a map generation unit 101, and a third correction unit 102.

When the resolver 23a and the angle computing unit 60 are normal, i.e., when the abnormality detection signal SAr is the value indicative of no abnormality, the shift amount measuring unit 100 measures the angular error θerr as the amount of shift between the motor electric angle θm computed by the angle computing unit 60, and the motor electric angle estimate θme estimated by the motor electric angle estimating unit 63.

Specifically, the shift amount measuring unit 100 of the fifth embodiment measures a relationship of the q-axis current command value Iq* related to the output torque of the three-phase electric motor 22, and the amount of shift between the first motor electric angle θm1 computed by the angle computing unit 60 and the motor electric angle estimate θme estimated by the motor electric angle estimating unit 63.

As described in the above-mentioned second embodiment, this shift amount is the amount of shift caused by the deformation, or the like, of the mechanical elements such as the reduction gear 21 standing between the output-side rotational angle sensor 13c and the three-phase electric motor 22.

In other words, when the resolver 23a and the angle computing unit 60 are normal, the shift amount measuring unit 100 calculates the q-axis current command value Iq*, and as the shift amount (angular error θerr), a difference between the motor electric angle θm used in computing this q-axis current command value Iq* and the motor electric angle estimate θme. Then, the q-axis current command value Iq* and the calculated angular error θerr are output to the map generation unit 101.

Note that the measurement timing is set, for example, as timing suitable for measurement, such as the timing of a stationary steering operation of the steering wheel 11 performed by the driver.

The map generation unit 101 stores, in the RAM 50, combinations of q-axis current command values Iq* input from the shift amount measuring unit 100, and angular errors θerr corresponding to the respective q-axis current command values Iq* while sorting the combinations in order of sequence suitable for reference to generate a shift amount map.

In response to input of a motor electric angle estimate θme and a q-axis current command value Iq*, the third correction unit 102 reads an angular error θerr corresponding to the input q-axis current command value Iq* from the shift amount map stored in the RAM 50. Then, the read angular error θerr is used to correct the motor electric angle estimate θme, and the corrected motor electric angle estimate is output to the electric angle selection unit 23d as the second motor electric angle θm2.

The shift amount map is held in the RAM 50 until the next map update.

Here, the motor electric angle estimating unit 63 corresponds to a motor electric angle estimating unit, and the control computing device 31 and the motor electric angle detecting circuit 23 correspond to a motor driving control unit.

Further, the torque sensor 13 corresponds to a torque detection unit, the output-side rotational angle sensor 13c corresponds to a steering angle detecting unit, the three-phase electric motor 22 corresponds to a multi-phase electric motor, and the resolver 23a and the angle computing unit 60 correspond to a motor electric angle detecting unit.

Further, the first and second inverter circuits 42A and 42B correspond to a motor driving circuit, the control computing device 31 corresponds to a control computing device, and the resolver abnormality diagnosing unit 61 corresponds to an abnormality diagnosis unit.

Further, the shift amount measuring unit 100 corresponds to a shift amount measuring unit, the map generation unit 101 corresponds to a shift amount storing unit, and the third correction unit 102 corresponds to a motor electric angle correcting unit.

Effects of Fifth Embodiment

In addition to the effects of the above-mentioned second embodiment, the fifth embodiment has the following effects.

(1) In the motor control apparatus 25 according to the fifth embodiment, when the resolver 23a and the angle computing unit 60 are normal, the shift amount measuring unit 100 measures a relationship of the value (q-axis current command value Iq*) related to the output torque of the three-phase electric motor 22, and the amount of shift (angular error θerr) between the motor electric angle θm and the motor electric angle estimate θme, which is caused by mechanical elements standing between the output-side rotational angle sensor 13c and the three-phase electric motor 22, and detected by the main motor electric angle detecting circuit 23b. The map generation unit 101 stores the relationship of the value related to the output torque and the shift amount, which is measured by the shift amount measuring unit 100. The third correction unit 102 corrects the motor electric angle estimate θme based on a shift amount corresponding to a value related to the output torque stored in the RAM 50 at the time of estimating the motor electric angle estimate θme.

According to this configuration, since the relationship between the value, related to the normal-time output torque and the shift amount can be prestored, an accurate angular error can be obtained, and hence a more accurate motor electric angle estimate θme can be obtained. In particular, the relationship between the value related to the output torque and the shift amount can be updated periodically to make the relationship responsive to the characteristics varying according to aged deterioration and the like.

(Variations)

(1) Each of the aforementioned embodiments is configured to estimate the motor electric angle based on the output shaft rotational angle detection value θos detected by the output-side rotational angle sensor 13c that constitutes part of the torque sensor 13, but the present invention is not limited to this configuration. For example, the motor electric angle may also be estimated based on the rotational angle detected by any other sensor as long as the sensor detects the rotational angle of a shaft rotating along with an operation of the steering wheel 11, such as to estimate the motor electric angle based on an input shaft rotational angle θ detected by the input-side rotational angle sensor 13b.

(2) In each of the aforementioned embodiments, the case where the control computing device 31 performs the steering assist control processing to calculate the d-axis current command value Id* and the q-axis current command value Iq* based on the steering assist current command value, perform dp-phase/three-phase conversion of these command values so as to calculate the U-phase current command value Iu*, the V-phase current command value Iv*, and the W-phase current command value Iw*, and calculate current deviations ΔIu, AIv and ΔIw between these current command values and additional values of the respective phases of the current detection values has been described. However, the present invention is not limited to the above configuration. The additional values of the respective phases of current detection values may be dq-axis converted to calculate deviations ΔId and ΔIq between these additional values and the d-axis current command value Id* and the q-axis current command value Iq* so as to perform dp-phase/three-phase conversion of the deviations ΔId and ΔIq.

(3) In each of the aforementioned embodiments, the example of applying the present invention to a column assist type electric power steering apparatus has been described, but the present invention is not limited to this configuration. For example, the present invention may also be applied to a rack assist type or pinion assist type electric power steering apparatus.

(4) The above-mentioned fifth embodiment has been described by taking the example of using the q-axis current command value Iq* as the value related to the output torque of the three-phase electric motor 22, but the present invention is not limited to this configuration. Any other value, such as the value of the output torque itself or any other associated value, may be used as long as the value is independent of the resolver 23a and the angle computing unit 60.

The entire contents of Japanese Patent Application No. P2015-159065 (filed Aug. 11, 2015) and Japanese Patent Application No. P2015-159066 (filed Aug. 11, 2015), from which this application claims the benefit of priority, are incorporated herein by reference.

While the description has been made with reference to a limited number of embodiments, the scope of rights is not limited to the embodiments, and it will be obvious to those skilled in the art that each embodiment can be altered based on the above disclosure.

REFERENCE SIGNS LIST

1 . . . vehicle, 3 . . . electric power steering apparatus, 11 . . . steering wheel, 12 . . . steering shaft, 12b . . . output shaft, 13 . . . torque sensor, 13c . . . output-side rotational angle sensor, 18 . . . steering gear, 20 . . . steering assist mechanism, 22 . . . three-phase electric motor, 23 . . . motor electric angle detecting circuit, 23a . . . resolver, 23b . . . main motor electric angle detecting circuit, 23c . . . sub-motor electric angle detecting circuit, 23d . . . electric angle selection unit, 23e . . . second sub-motor electric angle detecting circuit, 25 . . . motor control apparatus, 26 . . . vehicle speed sensor, 27 . . . battery, 28 . . . IGN switch, 31 . . . control computing device, 32A . . . first motor driving circuit, 32B . . . second motor driving circuit, 33A . . . first motor current cut-off circuit, 33B . . . second motor current cut-off circuit, 34A, 34B . . . current detection circuit, 35A . . . first abnormality detection circuit, 35B . . . second abnormality detection circuit, 41A, 41B . . . gate driving circuit, 42A . . . first inverter circuit, 42B . . . second inverter circuit, 43 . . . noise filter, 44A . . . first power shutdown circuit, 44B . . . second power shutdown circuit, 60 . . . angle computing unit, 61 . . . resolver abnormality diagnosing unit, 62 . . . relative offset amount estimating unit, 63 . . . motor electric angle estimating unit, 64 to 67 . . . first to fourth estimated angle correcting unit, 81 . . . zero-cross timing detecting unit, 84 . . . switching timing detection unit, 100 . . . shift amount measuring unit, 101 . . . map generation unit, 102 . . . third correction unit.

The invention claimed is:

1. A motor control apparatus comprising:
a motor electric angle estimating unit that estimates a motor electric angle of a multi-phase electric motor based on a steering angle detected by a steering angle detecting unit that detects the steering angle, where the multi-phase electric motor generates a steering assist force;
a motor driving control unit that controls driving of the multi-phase electric motor based on a motor electric angle detected by a motor electric angle detecting unit that detects the motor electric angle when the motor electric angle detecting unit is normal, and controls the driving of the multi-phase electric motor based on a motor electric angle estimate estimated by the motor electric angle estimating unit when the motor electric angle detecting unit is abnormal;
a motor electric angle correcting unit that corrects the motor electric angle estimate based on back electromotive voltage of the multi-phase electric motor; and
a cross timing detecting unit that detects timing at which each phase of a back electromotive voltage waveform of the multi-phase electric motor crosses zero,
wherein when the cross timing detecting unit detects the zero-cross timing, the motor electric angle correcting unit corrects the motor electric angle estimate based on motor electric angle information corresponding to a zero-cross point.

2. A motor control apparatus comprising:
a motor electric angle estimating unit that estimates a motor electric angle of a multi-phase electric motor based on a steering angle detected by a steering angle detecting unit that detects the steering angle, where the multi-phase electric motor generates a steering assist force;
a motor driving control unit that controls driving of the multi-phase electric motor based on a motor electric angle detected by a motor electric angle detecting unit that detects the motor electric angle when the motor electric angle detecting unit is normal, and controls the driving of the multi-phase electric motor based on a motor electric angle estimate estimated by the motor electric angle estimating unit when the motor electric angle detecting unit is abnormal;
a motor electric angle correcting unit that corrects the motor electric angle estimate based on back electromotive voltage of the multi-phase electric motor; and
a switching timing detection unit that detects timing at which a combination of a magnitude relationship and a sign relationship of respective phases of back electromotive voltage waveforms of the multi-phase electric motor is switched to any other combination of the magnitude relationship and the sign relationship,
wherein when the switching timing detection unit detects the switching timing, the motor electric angle correcting unit corrects the motor electric angle estimate based on motor electric angle information corresponding to a switching point.

3. A motor control apparatus comprising:
a motor electric angle estimating unit that estimates a motor electric angle of a multi-phase electric motor based on a steering angle detected by a steering angle detecting unit that detects the steering angle, where the multi-phase electric motor generates a steering assist force;
a motor driving control unit that controls driving of the multi-phase electric motor based on a motor electric angle detected by a motor electric angle detecting unit that detects the motor electric angle when the motor electric angle detecting unit is normal, and controls the driving of the multi-phase electric motor based on a motor electric angle estimate estimated by the motor electric angle estimating unit when the motor electric angle detecting unit is abnormal; and
a motor electric angle correcting unit that corrects the motor electric angle estimate based on back electromotive voltage of the multi-phase electric motor,
wherein the motor electric angle correcting unit corrects the motor electric angle estimate based on a phase difference or an amplitude difference between back electromotive voltage, calculated based on a motor voltage detection value and a motor current detection value of the multi-phase electric motor, and back electromotive voltage calculated based on the motor electric angle estimate.

4. A motor control apparatus comprising:
a torque detection unit that detects torque transmitted to a steering mechanism;
a steering angle detecting unit that detects a steering angle;
a multi-phase electric motor that generates a steering assist force;
a motor electric angle detecting unit that detects a motor electric angle of the multi-phase electric motor;
a motor driving circuit that supplies drive current to the multi-phase electric motor;
a control computing device that controls driving of the motor driving circuit based on the torque detected by the torque detection unit and the motor electric angle detected by the motor electric angle detecting unit;
an abnormality detection unit that detects an abnormality of the motor electric angle detecting unit;
a motor electric angle estimating unit that estimates the motor electric angle based on the steering angle detected by the steering angle detecting unit;
a motor electric angle correcting unit that corrects the motor electric angle estimate based on back electromotive voltage of the multi-phase electric motor; and
a cross timing detecting unit that detects timing at which each phase of a back electromotive voltage waveform of the multi-phase electric motor crosses zero,
wherein when the cross timing detecting unit detects the zero-cross timing, the motor electric angle correcting unit corrects the motor electric angle estimate based on motor electric angle information corresponding to a zero-cross point, and
wherein when the abnormality of the motor electric angle detecting unit is detected by the abnormality detection unit, the control computing device controls the driving of the motor driving circuit based on the torque detected by the torque detection unit and a motor electric angle estimate estimated by the motor electric angle estimating unit.

5. A motor control apparatus comprising:
a torque detection unit that detects torque transmitted to a steering mechanism;
a steering angle detecting unit that detects a steering angle;
a multi-phase electric motor that generates a steering assist force;
a motor electric angle detecting unit that detects a motor electric angle of the multi-phase electric motor;
a motor driving circuit that supplies drive current to the multi-phase electric motor;
a control computing device that controls driving of the motor driving circuit based on the torque detected by the torque detection unit and the motor electric angle detected by the motor electric angle detecting unit;
an abnormality detection unit that detects an abnormality of the motor electric angle detecting unit;
a motor electric angle estimating unit that estimates the motor electric angle based on the steering angle detected by the steering angle detecting unit;
a motor electric angle correcting unit that corrects the motor electric angle estimate based on back electromotive voltage of the multi-phase electric motor; and
a switching timing detection unit that detects timing at which a combination of a magnitude relationship and a sign relationship of respective phases of back electromotive voltage waveforms of the multi-phase electric motor is switched to any other combination of the magnitude relationship and the sign relationship,
wherein when the switching timing detection unit detects the switching timing, the motor electric angle correcting unit corrects the motor electric angle estimate based on motor electric angle information corresponding to a switching point, and
wherein when the abnormality of the motor electric angle detecting unit is detected by the abnormality detection unit, the control computing device controls the driving of the motor driving circuit based on the torque detected by the torque detection unit and a motor electric angle estimate estimated by the motor electric angle estimating unit.

6. A motor control apparatus comprising:
a torque detection unit that detects torque transmitted to a steering mechanism;
a steering angle detecting unit that detects a steering angle;
a multi-phase electric motor that generates a steering assist force;
a motor electric angle detecting unit that detects a motor electric angle of the multi-phase electric motor;
a motor driving circuit that supplies drive current to the multi-phase electric motor;
a control computing device that controls driving of the motor driving circuit based on the torque detected by the torque detection unit and the motor electric angle detected by the motor electric angle detecting unit;
an abnormality detection unit that detects an abnormality of the motor electric angle detecting unit;
a motor electric angle estimating unit that estimates the motor electric angle based on the steering angle detected by the steering angle detecting unit; and
a motor electric angle correcting unit that corrects the motor electric angle estimate based on back electromotive voltage of the multi-phase electric motor, wherein when the abnormality of the motor electric angle detecting unit is detected by the abnormality detection unit, the control computing device controls the driving of the motor driving circuit based on the torque detected by the torque detection unit and a motor electric angle estimate estimated by the motor electric angle estimating unit, and wherein the motor electric angle correcting unit corrects the motor electric angle estimate based on a phase difference or an amplitude difference between back electromotive voltage, calculated based on a motor voltage detection value and a motor current detection value of the multi-phase electric motor, and back electromotive voltage calculated based on the motor electric angle estimate.

* * * * *